US012681709B2

(12) United States Patent
Rathinam et al.

(10) Patent No.: US 12,681,709 B2
(45) Date of Patent: Jul. 14, 2026

(54) LATE BINDING AND PACKAGE TRANSLATION FOR MULTI-CLOUD DEPLOYMENT

(71) Applicant: Dell Products L.P., Round Rock, TX (US)

(72) Inventors: Bharath Rathinam, Singapore (SG); Michael Behan, Athlone (IE); Sivakumar Subramani, Austin, TX (US); Rajani Srivastava, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 325 days.

(21) Appl. No.: 18/586,965

(22) Filed: Feb. 26, 2024

(65) Prior Publication Data

US 2025/0272076 A1 Aug. 28, 2025

(51) Int. Cl.
*G06F 8/60* (2018.01)
(52) U.S. Cl.
CPC ..................................... *G06F 8/60* (2013.01)
(58) Field of Classification Search
CPC ......................................................... G06F 8/60
See application file for complete search history.

(56) References Cited

U.S. PATENT DOCUMENTS

| | | | | |
|---|---|---|---|---|
| 2003/0195921 A1* | 10/2003 | Becker | .................... | H04L 67/34 |
| | | | | 709/200 |
| 2013/0198718 A1* | 8/2013 | Kunze | ....................... | G06F 8/61 |
| | | | | 717/121 |

| | | | | |
|---|---|---|---|---|
| 2021/0311641 A1* | 10/2021 | Prakashaiah | .......... | G06F 3/0604 |
| 2023/0280996 A1* | 9/2023 | Torres | ....................... | G06F 8/72 |

FOREIGN PATENT DOCUMENTS

| | | | | |
|---|---|---|---|---|
| WO | WO-2022037612 A1 * | 2/2022 | ............... | G06F 8/65 |

OTHER PUBLICATIONS

"Application Service Descriptor (ASD) onboarding Information Model, ver. 1.0." ONAP Wiki. [https://lf-onap.atlassian.net/wiki/pages/viewpage.action?pageId=128715159] retrieved Dec. 1, 2025, 19 pages.

(Continued)

*Primary Examiner* — Phillip H Nguyen
(74) *Attorney, Agent, or Firm* — Amin, Turocy & Watson, LLP

(57) ABSTRACT

A system can identify an application package of an application that is configured to execute via a computing platform, wherein the application package comprises a deployment manifest. The system can model respective capabilities of respective computing platforms to produce capability models. The system can, based on determining to execute the application via a selected computing platform of the computing platforms, determine a capability of capabilities of the selected computing platform based on the capability models and the deployment manifest, modify the deployment manifest based on the capability to produce a modified deployment manifest, configure the capability corresponding to specifications of the application identified in the modified deployment manifest, and instantiate the application via the selected computing platform with the modified deployment manifest.

20 Claims, 20 Drawing Sheets

(56) References Cited

OTHER PUBLICATIONS

"Network Functions Virtualisation (NFV) Release 4; Management and Orchestration; VNF Descriptor and Packaging Specification" ETSI GS NFV-IFA 011 v4.5.1, September 2023, 123 pages.
"Intel/kubernetes-power-manager" Github. [https://github.com/intel/kubernetes-power-manager], retrieved Dec. 1, 2025, 16 pages.
Rathinam et al. "Late Binding and Package Translation for Multi-Cloud Deployment Using Generative Artificial Intelligence" U.S. Appl. No. 18/988,810, filed Dec. 19, 2024, 71 pages.

* cited by examiner

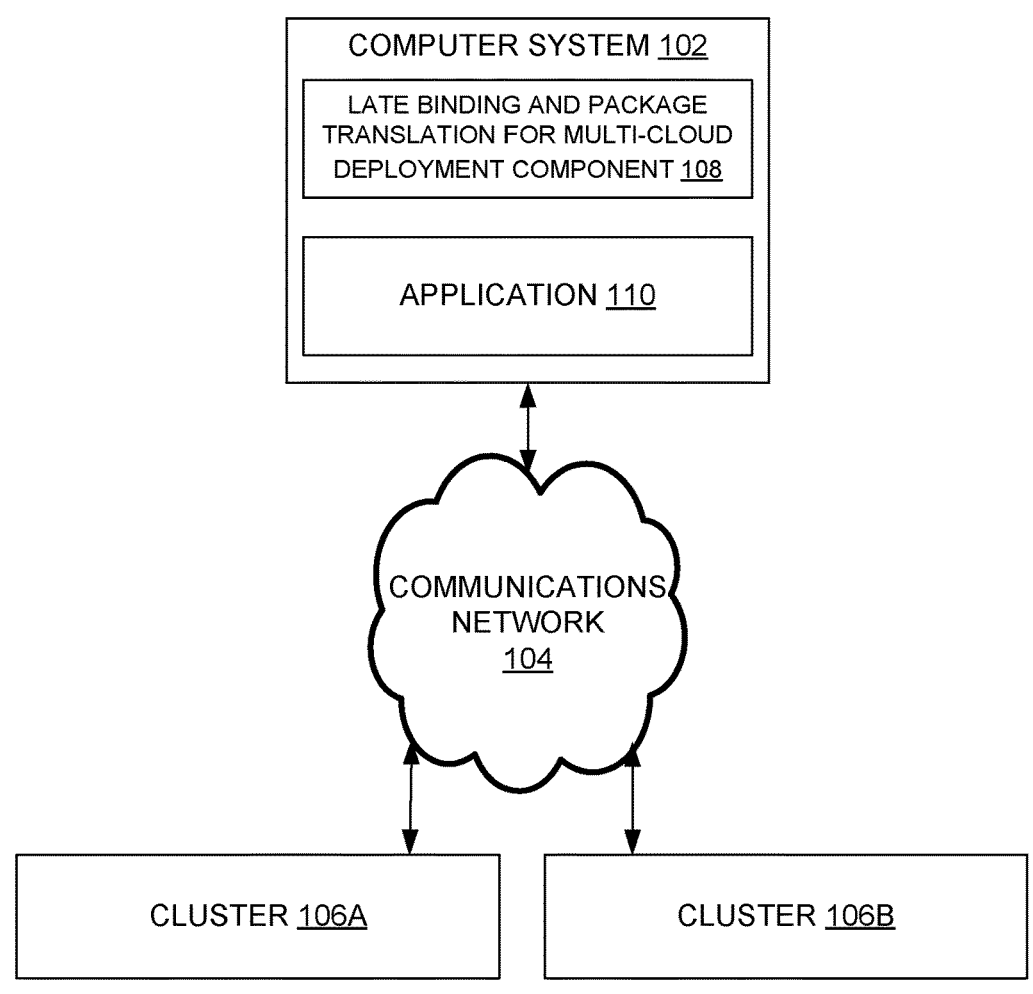
FIG. 1

300

LATE BINDING AND PACKAGE
TRANSLATION FOR MULTI-CLOUD
DEPLOYMENT COMPONENT 306

304

302

| ATTRIBUTE | QUALIFIER | CARDINALITY | CONTENT | DESCRIPTION |
|---|---|---|---|---|
| minKernelVersion | M | 1 | STRING | MINIMAL REQUIRED KERNEL VERSION |
| requiredKernelModules | M | 0..N | STRING | REQUIRED KERNEL MODULES |
| conflictingKernelModules | M | 0..N | STRUCTURE (INLINED) | KERNEL MODULES THAT CANNOT BE PRESENT IN TARGET ENVIRONMENT |
| requiredCustomResources | M | 0..N | STRING | REQUIRED CUSTOM RESOURCE TYPES IN TARGET ENVIRONMENT |
| >kind | M | 0..1 | STRING | KIND OF THE CUSTOM RESOURCE |
| >apiVersion | M | 0..1 | STRING | API VERSION OF THE CUSTOM RESOURCE |
| clusterLabels | M | 0..N | STRING | ARBITRARY LABELS FOR CLUSTERS |
| requiredPlugin | M | 0..N | STRUCTURE (INLINED) | NAMES AND VERSIONS OF REQUIRED PLUGINS |
| >requiredPluginName | M | 0..1 | STRING | NAMES OF REQUIRED PLUGINS |
| >requiredPluginVersion | M | 0..1 | STRONG | VERSIONS OF REQUIRED PLUGINS |

LATE BINDING AND PACKAGE
TRANSLATION FOR MULTI-CLOUD
DEPLOYMENT COMPONENT 404

```
CONFIGURATION INFORMATION 402 apiVersion: v1
kind: Pod
metadata:
        name: <name>
        annotations:
                io/networks: '[
                        { "name": "<name2>" }
                ]'
spec:
        restartPolicy: Never
        containers:
        - name: <name>
          image: "<name>-image"
          volumeMounts:
          - mountPath: /mnt/<location>
            name: <name3>
          stdin: true
          tty: true
          resources:
                requests:
                        memory: 4Gi
                        <typeA>.com/<typeA>_fpga_fec: '1'
                        <typeA>.com/pci_net_datanewtork_a: '1'
                limits:
                        pages-1Gi: 4Gi
                        memory: 4Gi
                        <typeA>.com/<typeA>_fpga_fec: '1'
                        <typeA>.com/pci_net_datanewtork_a: '1'
volumes:
- name: page
  emptyDir:
        medium: Pages
```

```
LATE BINDING AND PACKAGE
TRANSLATION FOR MULTI-CLOUD
DEPLOYMENT COMPONENT 506
```

502

504

| ATTRIBUTE | QUALIFIER | CARDINALITY | CONTENT | DESCRIPTION |
|---|---|---|---|---|
| requestAdditionalCapabilityName | M | 1 | STRING | SPECIFIES A REQUESTED ADDITIONAL CAPABILITY FOR THE VDU |
| supportMandatory | M | 1 | BOOLEAN | INDICATES WHETHER THE REQUESTED ADDITIONAL CAPABILITY IS MANDATORY |
| minRequestedAdditionalCapabilityVersion | M | 0..1 | VERSION | SPECIFIES THE MINIMUM VERSION OF THE REQUESTED ADDITIONAL CAPABILITY |
| preferredRequestedAdditionalCapabilityVersion | M | 0..1 | VERSION | SPECIFIES THE PREFERRED VERSION OF THE REQUESTED ADDITIONAL CAPABILITY |
| targetPerformanceParameters | M | 0..N | KeyValuePair | SPECIFIES SPECIFIC ATTRIBUTES |

FIG. 5

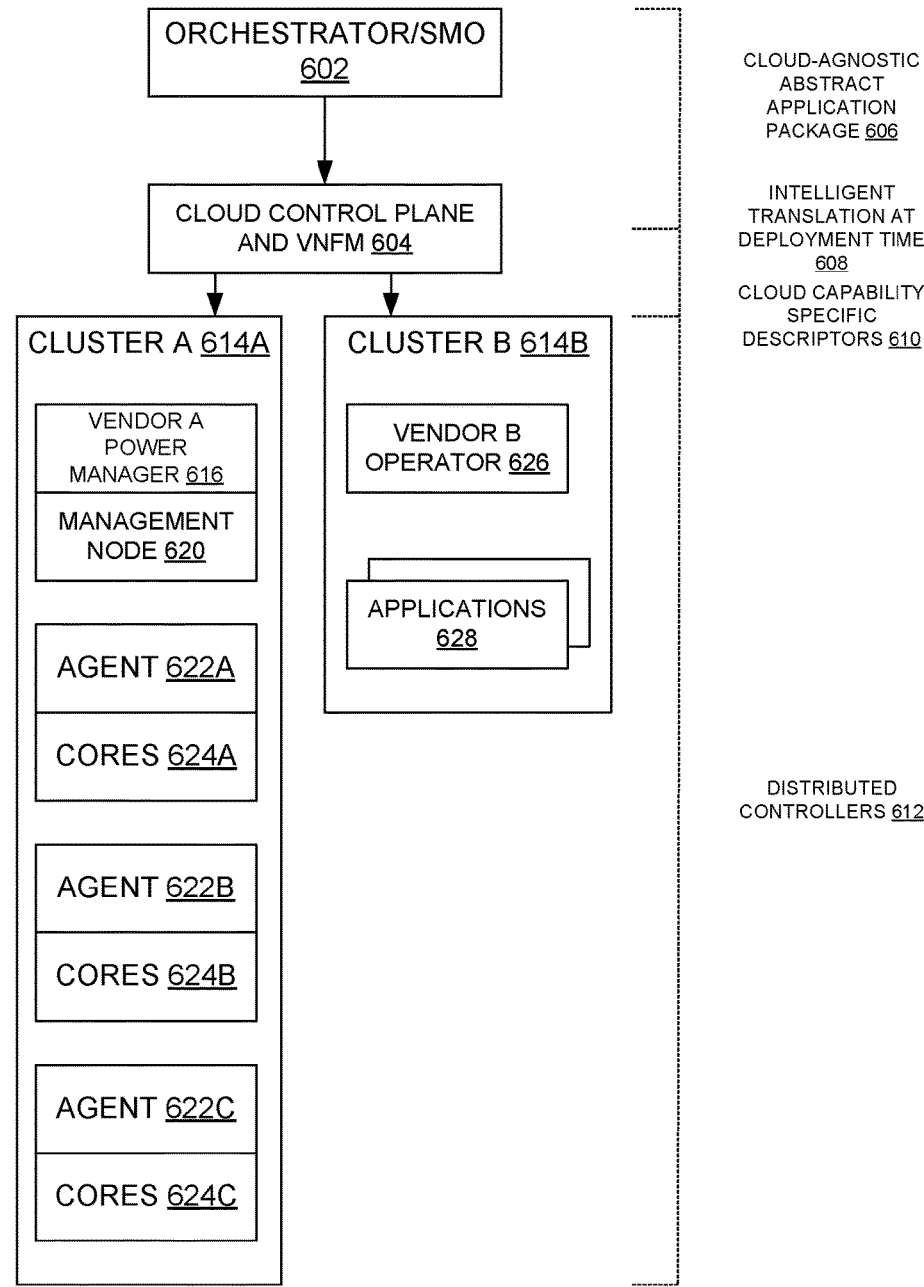
FIG. 6

Figure 13:
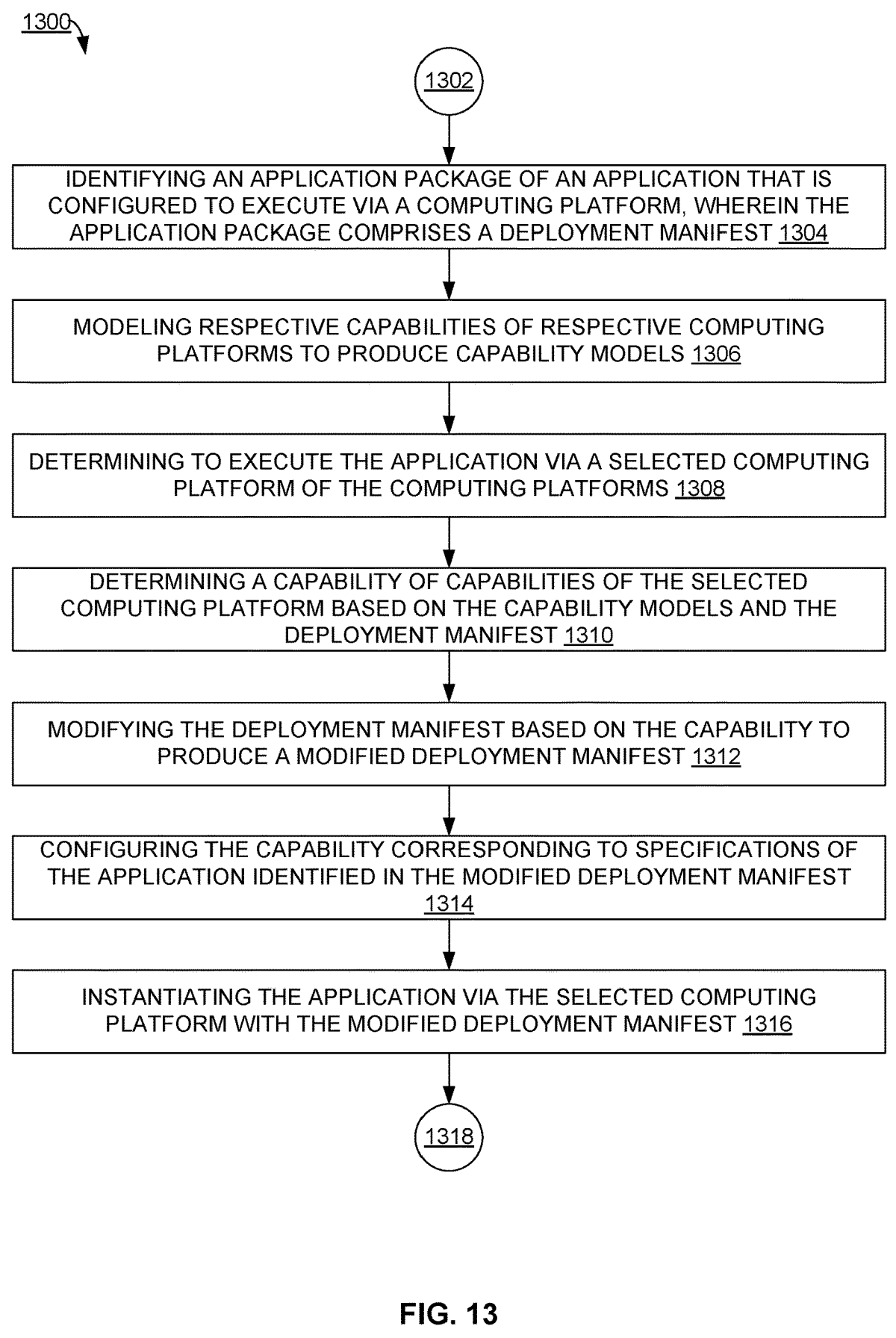

1300

( 1302 )

IDENTIFYING AN APPLICATION PACKAGE OF AN APPLICATION THAT IS CONFIGURED TO EXECUTE VIA A COMPUTING PLATFORM, WHEREIN THE APPLICATION PACKAGE COMPRISES A DEPLOYMENT MANIFEST 1304

MODELING RESPECTIVE CAPABILITIES OF RESPECTIVE COMPUTING PLATFORMS TO PRODUCE CAPABILITY MODELS 1306

DETERMINING TO EXECUTE THE APPLICATION VIA A SELECTED COMPUTING PLATFORM OF THE COMPUTING PLATFORMS 1308

DETERMINING A CAPABILITY OF CAPABILITIES OF THE SELECTED COMPUTING PLATFORM BASED ON THE CAPABILITY MODELS AND THE DEPLOYMENT MANIFEST 1310

MODIFYING THE DEPLOYMENT MANIFEST BASED ON THE CAPABILITY TO PRODUCE A MODIFIED DEPLOYMENT MANIFEST 1312

CONFIGURING THE CAPABILITY CORRESPONDING TO SPECIFICATIONS OF THE APPLICATION IDENTIFIED IN THE MODIFIED DEPLOYMENT MANIFEST 1314

INSTANTIATING THE APPLICATION VIA THE SELECTED COMPUTING PLATFORM WITH THE MODIFIED DEPLOYMENT MANIFEST 1316

Figure 14:
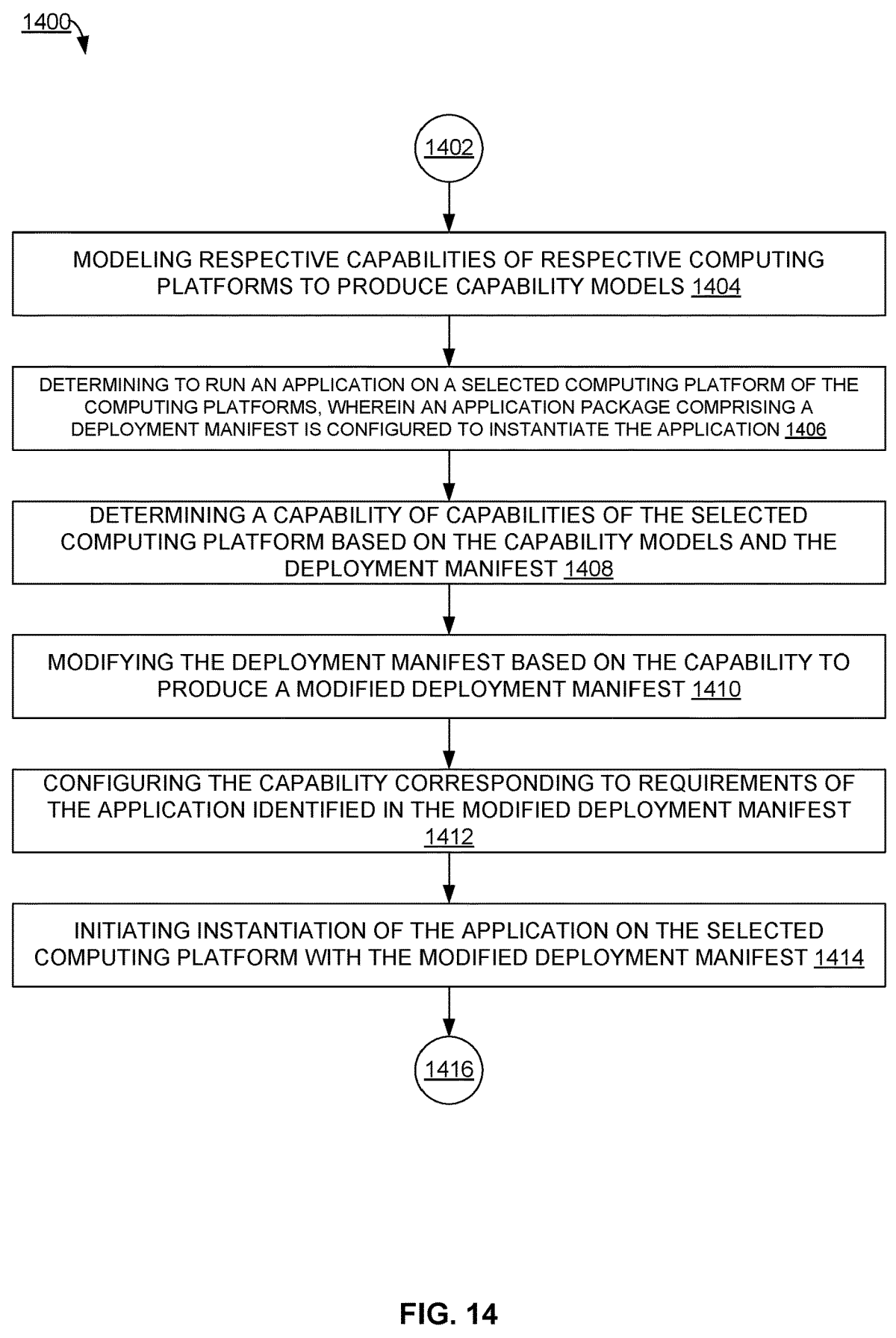

MODELING RESPECTIVE CAPABILITIES OF RESPECTIVE COMPUTING PLATFORMS TO PRODUCE CAPABILITY MODELS 1404

DETERMINING TO RUN AN APPLICATION ON A SELECTED COMPUTING PLATFORM OF THE COMPUTING PLATFORMS, WHEREIN AN APPLICATION PACKAGE COMPRISING A DEPLOYMENT MANIFEST IS CONFIGURED TO INSTANTIATE THE APPLICATION 1406

DETERMINING A CAPABILITY OF CAPABILITIES OF THE SELECTED COMPUTING PLATFORM BASED ON THE CAPABILITY MODELS AND THE DEPLOYMENT MANIFEST 1408

MODIFYING THE DEPLOYMENT MANIFEST BASED ON THE CAPABILITY TO PRODUCE A MODIFIED DEPLOYMENT MANIFEST 1410

CONFIGURING THE CAPABILITY CORRESPONDING TO REQUIREMENTS OF THE APPLICATION IDENTIFIED IN THE MODIFIED DEPLOYMENT MANIFEST 1412

INITIATING INSTANTIATION OF THE APPLICATION ON THE SELECTED COMPUTING PLATFORM WITH THE MODIFIED DEPLOYMENT MANIFEST 1414

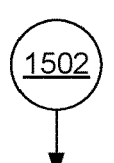

1502

MODELING A CAPABILITY OF A CLUSTER OF A GROUP OF CLUSTERS TO PRODUCE A CAPABILITY MODEL 1504

DETERMINING TO INSTANTIATE AN APPLICATION VIA THE CLUSTER, WHEREIN AN APPLICATION PACKAGE COMPRISING A DEPLOYMENT MANIFEST IS CONFIGURED TO INSTANTIATE THE APPLICATION, DETERMINING A CAPABILITY OF CAPABILITIES OF THE CLUSTER BASED ON THE CAPABILITY MODEL AND THE DEPLOYMENT MANIFEST 1506

MODIFYING THE DEPLOYMENT MANIFEST BASED ON THE CAPABILITY TO PRODUCE A MODIFIED DEPLOYMENT MANIFEST 1508

CONFIGURING THE CAPABILITY CORRESPONDING TO OPERATIONAL CHARACTERISTICS OF THE APPLICATION IDENTIFIED IN THE MODIFIED DEPLOYMENT MANIFEST 1510

INITIATING INSTANTIATION OF THE APPLICATION VIA THE CLUSTER WITH THE MODIFIED DEPLOYMENT MANIFEST 1512

1600

LATE BINDING AND PACKAGE
TRANSLATION FOR MULTI-CLOUD
DEPLOYMENT COMPONENT 1604

POWER PROFILES DEFINITION 1602

```
...
...
VDU10:
        properties:
                description: controller resource as VDU
                name: new-deployment
                vdu_profile:
                        max_number_of_instances: 1
                        min_number_of_instances: 1
        type: tosca.nodes.nfv.vdu.compute
                power_profiles:
                default_profile: Performance
                name: Performance
                description: High-performance profile
                        supported_p_states:
                                frequency_min: "3300 Mhz"
                                frequency_max: "3300 Mhz"

supported_c_states:
                                cstate_value: "C0"
                                cstate_value: "C1"
                name: BalancedPower
                description: Balanced power profile
                        supported_p_states:
                                frequency_min: "2900 Mhz"
                                frequency_max: "2500 Mhz"

supported_c_states:
                                cstate_value: "C0"
                                cstate_value: "C1"
                                cstate_value: "C1E"
                name: BalancedPower
                description: Balanced power profile
                        supported_p_states:
                                frequency_min: "2500 Mhz"
                                frequency_max: "2000 Mhz"

supported_c_states:
                                cstate_value: "C0"
                                cstate_value: "C1"
                                cstate_value: "C6"
        type: tosca.nodes.nfv.vdu.PowerProfile
...
...
```

FIG. 16

1800

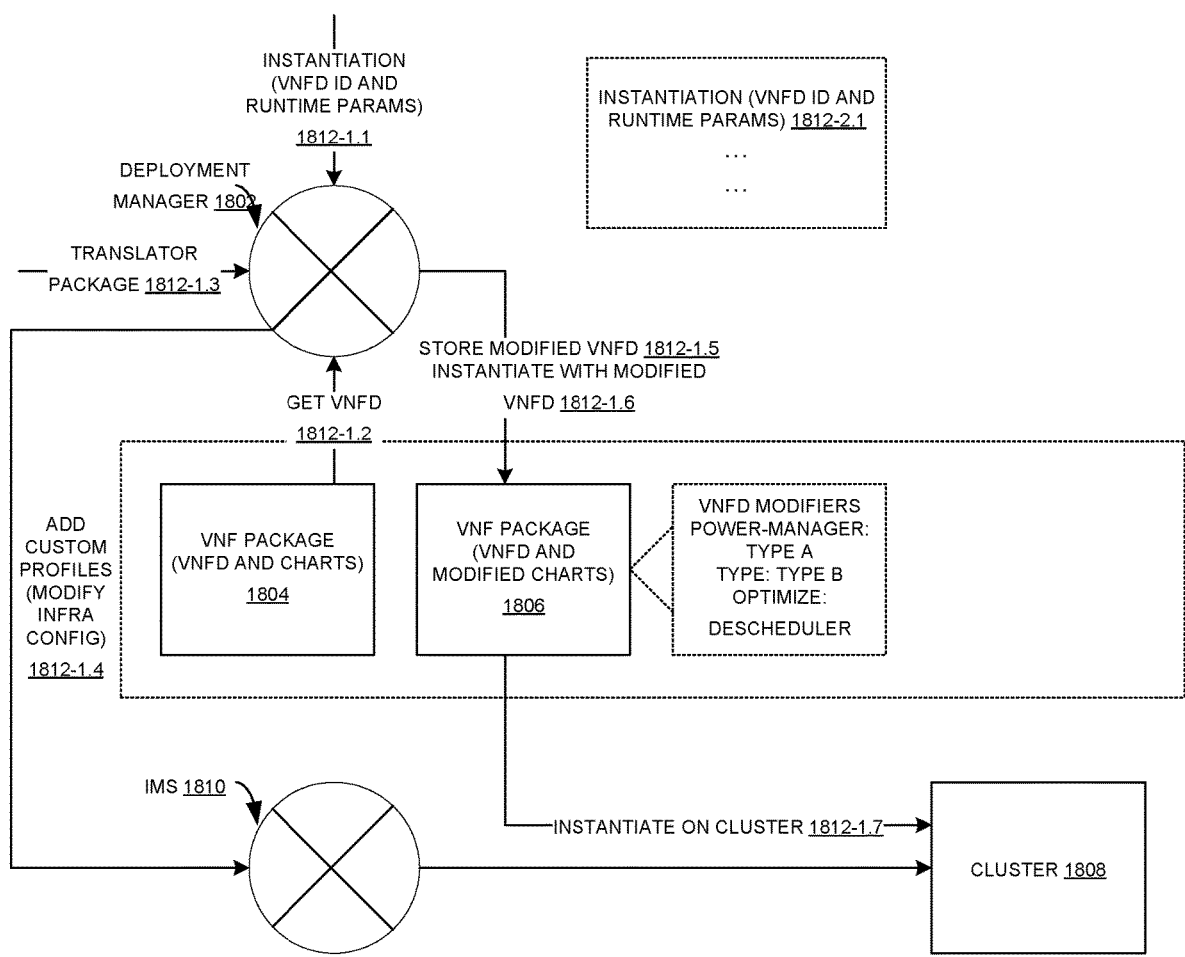

INSTANTIATION
(VNFD ID AND
RUNTIME PARAMS)
1812-1.1

INSTANTIATION (VNFD ID AND
RUNTIME PARAMS) 1812-2.1
...
...

DEPLOYMENT
MANAGER 1802

TRANSLATOR
PACKAGE 1812-1.3

STORE MODIFIED VNFD 1812-1.5
INSTANTIATE WITH MODIFIED

GET VNFD                              VNFD 1812-1.6

1812-1.2

ADD
CUSTOM
PROFILES
(MODIFY
INFRA
CONFIG)
1812-1.4

VNF PACKAGE
(VNFD AND CHARTS)
1804

VNF PACKAGE
(VNFD AND
MODIFIED CHARTS)
1806

VNFD MODIFIERS
POWER-MANAGER:
TYPE A
TYPE: TYPE B
OPTIMIZE:

DESCHEDULER

IMS 1810

INSTANTIATE ON CLUSTER 1812-1.7

CLUSTER 1808

FIG. 18

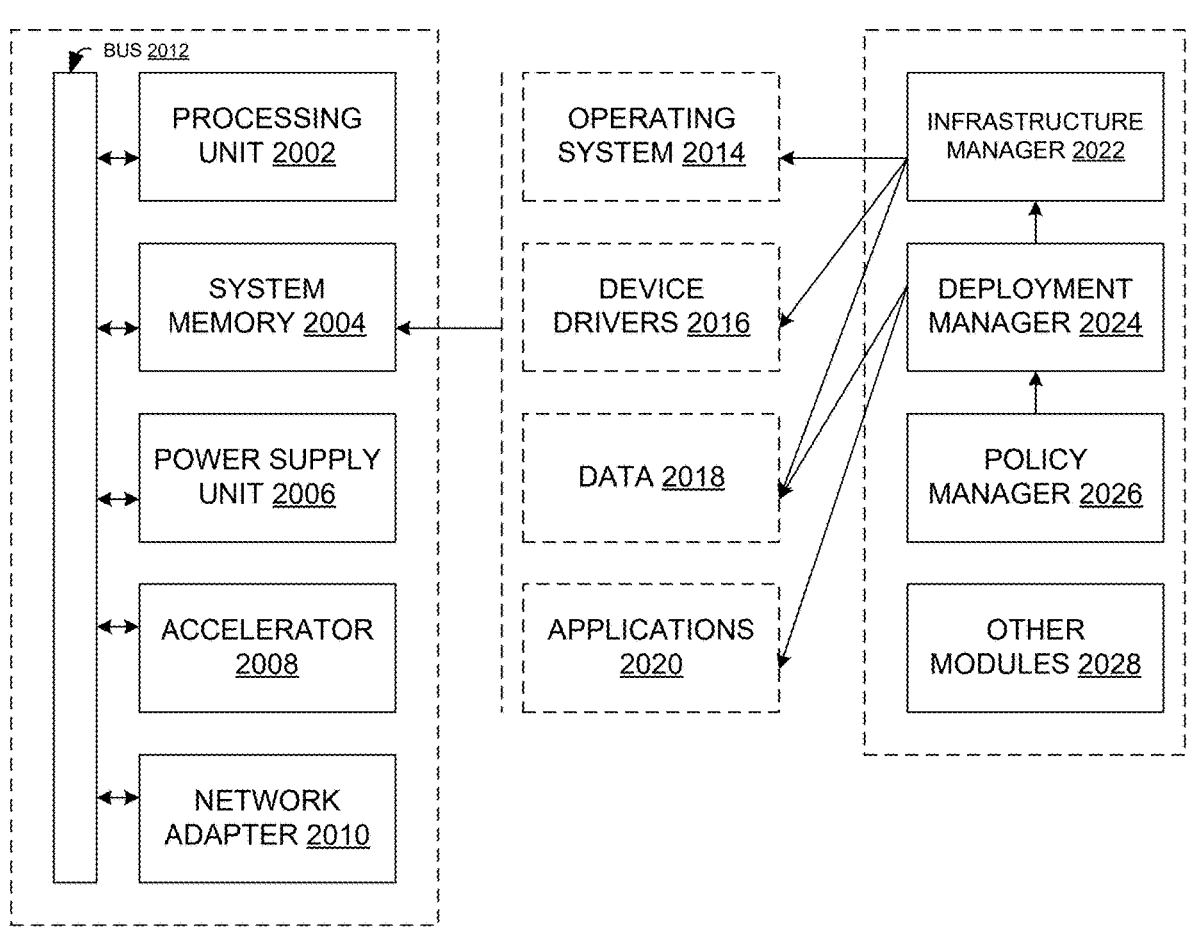
FIG. 20

LATE BINDING AND PACKAGE TRANSLATION FOR MULTI-CLOUD DEPLOYMENT

BACKGROUND

Applications can be instantiated on telecommunications clusters.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify an application package of an application that is configured to execute via a computing platform, wherein the application package comprises a deployment manifest. The system can model respective capabilities of respective computing platforms to produce capability models. The system can, based on determining to execute the application via a selected computing platform of the computing platforms, determine a capability of capabilities of the selected computing platform based on the capability models and the deployment manifest, modify the deployment manifest based on the capability to produce a modified deployment manifest, configure the capability corresponding to specifications of the application identified in the modified deployment manifest, and instantiate the application via the selected computing platform with the modified deployment manifest.

An example method can comprise modeling, by a system comprising at least one processor, respective capabilities of respective computing platforms to produce capability models. The method can further comprise, based on determining to run an application on a selected computing platform of the computing platforms, wherein an application package comprising a deployment manifest is configured to instantiate the application, determining, by the system, a capability of capabilities of the selected computing platform based on the capability models and the deployment manifest, modifying, by the system, the deployment manifest based on the capability to produce a modified deployment manifest, configuring, by the system, the capability corresponding to requirements of the application identified in the modified deployment manifest, and initiating, by the system, instantiation of the application on the selected computing platform with the modified deployment manifest.

An example non-transitory computer-readable medium can comprise instructions that, in response to execution, cause a system comprising a processor to perform operations. These operations can comprise modeling a capability of a cluster of a group of clusters to produce a capability model. These operations can further comprise, based on determining to instantiate an application via the cluster, wherein an application package comprising a deployment manifest is configured to instantiate the application, determining a capability of capabilities of the cluster based on the capability model and the deployment manifest. These operations can further comprise modifying the deployment manifest based on the capability to produce a modified deployment manifest. These operations can further comprise configuring the capability corresponding to operational characteristics of the application identified in the modified deployment manifest. These operations can further comprise initiating instantiation of the application via the cluster with the modified deployment manifest.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate late binding and package translation for multi-cloud deployment, in accordance with an embodiment of this disclosure;

FIG. 3 illustrates an example table of cluster capabilities, and that can facilitate late binding and package translation for multi-cloud deployment, in accordance with an embodiment of this disclosure;

FIG. 4 illustrates an example application manifest, and that can facilitate late binding and package translation for multi-cloud deployment, in accordance with an embodiment of this disclosure;

FIG. 5 illustrates another example table of cluster capabilities, and that can facilitate late binding and package translation for multi-cloud deployment, in accordance with an embodiment of this disclosure;

FIG. 6 illustrates an example system architecture for power savings using application specific power and performance (C/P) states tuning, and that can facilitate late binding and package translation for multi-cloud deployment, in accordance with an embodiment of this disclosure;

FIG. 13 illustrates an example process flow that can facilitate late binding and package translation for multi-cloud deployment, in accordance with an embodiment of this disclosure;

FIG. 14 illustrates another example process flow that can facilitate late binding and package translation for multi-cloud deployment, in accordance with an embodiment of this disclosure;

FIG. 15 illustrates another example process flow that can facilitate late binding and package translation for multi-cloud deployment, in accordance with an embodiment of this disclosure;

FIG. 16 illustrates an example power profiles definition, and that can facilitate late binding and package translation for multi-cloud deployment, in accordance with an embodiment of this disclosure;

FIG. 18 illustrates an example system architecture for instantiating an application on a cluster type a first time, and that can facilitate late binding and package translation for multi-cloud deployment, in accordance with an embodiment of this disclosure;

FIG. 20 illustrates an example block diagram of a computer operable to execute an embodiment of this disclosure.

DETAILED DESCRIPTION

Overview

Figure 2:
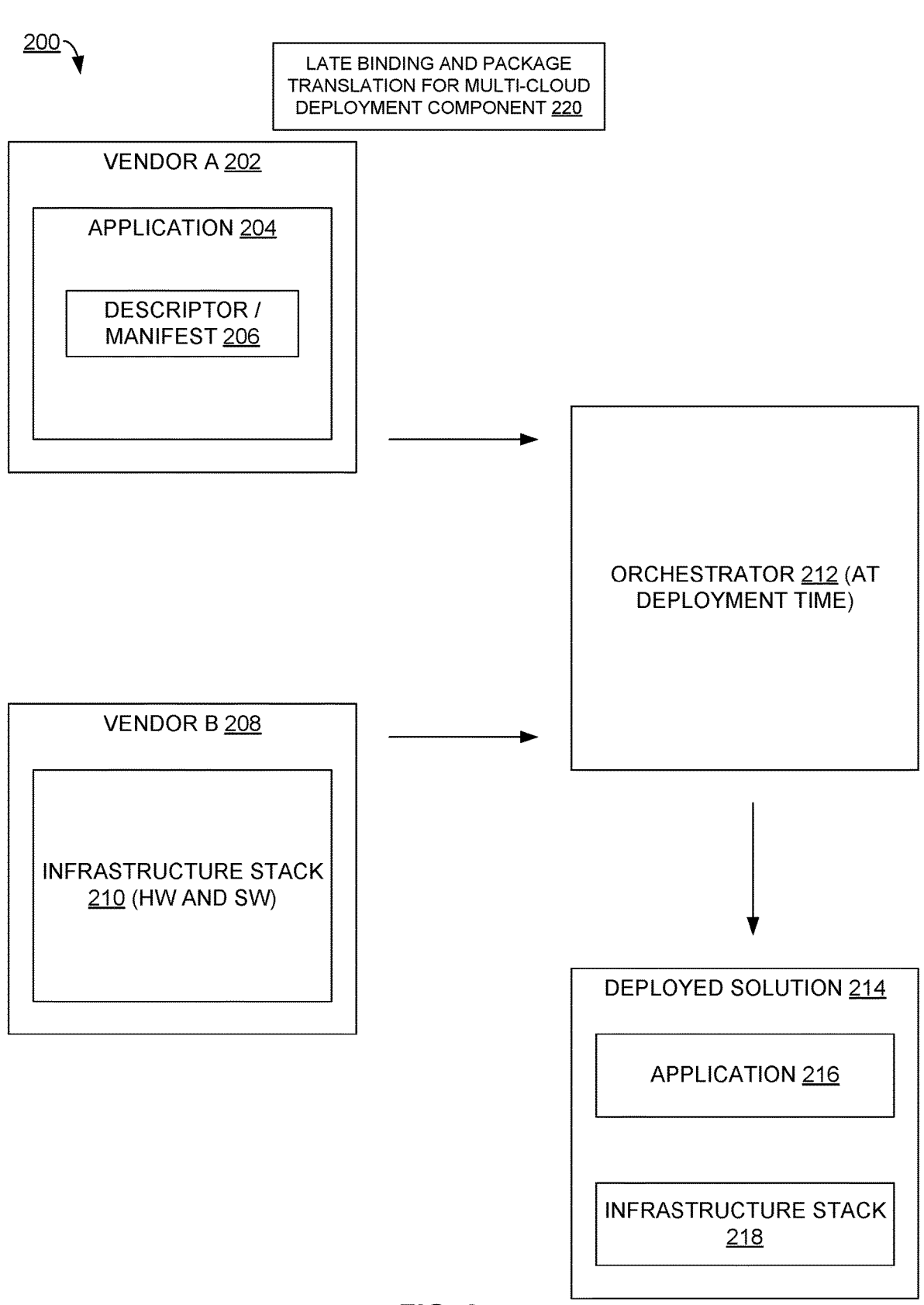
FIG. 2 illustrates an example system architecture for late-binding of an application to a cluster, and that can facilitate late binding and package translation for multi-cloud deployment, in accordance with an embodiment of this disclosure.

The present examples generally relate to power management settings for applications in a telecommunications network. It can be appreciated that these are illustrative examples, and that the present techniques can be applied more generally to capabilities of different computing clusters that can be utilized by applications that are deployed to those clusters. A cluster can generally comprise a group of computing nodes that are configured to execute a containerized application. A container can comprise an isolated runtime environment, and a containerized application can comprise a plurality of microservices each executing in a respective container. It can be appreciated that this is one example architecture, and the present techniques can be implemented with different architectures to facilitate late binding and package translation for multi-cloud deployment.

The present examples also generally relate to applications deployed in one or more containers on a computing cluster (which can comprise a group of computers working together such that they can logically be viewed as one computer, or in other examples, one computer) in a telecommunications context (e.g., to facilitate broadband cellular communications), where power management can be important. It can be appreciated that these are illustrative examples, and that the present techniques can be applied more generally to different types of late-binding between an application and a computing platform that the application will run on in application instantiation.

In some prior approaches, telecom systems comprised pre-assembled "appliances," where an application and hardware on which the application was deployed were early-binded at the factory.

In some more-recent prior approaches utilizing cloud-ified information technology (IT) systems, it can be that an application has no special capability requirements to make on a cloud platform. That is, the platforms can usually be large enough to cope with application demands.

Then, more recently than that, prior approaches to a telecom scenario can use cloud platforms that are smaller and widely distributed compared to the cloud-ified IT systems. The applications can have specific capability requirements in terms of performance, network latency, power management, etc. It can be that these telecom applications are not usually deployable on typical general-purpose cloud platforms.

It can be that prior approaches fail to meet late-binding needs of both telecom and general purpose IT applications and platforms. In contrast, the present techniques can facilitate late-binding via a model-based approach to provide just-in-time reconfiguration of both an application and its platform. Previously, telecom cloud applications have depended on knowing exact platform capabilities, which can run counter to cloud principles. The present techniques can remove this burden of application vendors knowing exact platform capabilities for designing their applications, and can automate a late-binding and reconfiguration process of applications.

In a telecommunications scenario, it can be that prior approaches to orchestration of applications can assume that an application package designer has a prior understanding of a target cluster's capabilities. For example, there can be work done in an Open Radio Access Network (O-RAN) working group to standardize certain capabilities (e.g., profiles), but this has not been applied to C/P states. It can be that standards do not define all capabilities that exist now, or in the future, as that could impede innovation by both software and hardware manufacturers.

It can be that a cluster capabilities requirement expressed in an application package can be used for placement (e.g., selection of suitable cluster(s) among multiple clusters).

Application manifests (which can generally comprise metadata about a corresponding information, such as which capabilities of a cluster on which the application is to be installed the application will utilize) created by a designer can identify resource specifications, but they can also be expected to comprise attributes to request resources of a specific type based on capabilities, custom resources and/or cluster controllers of a target cluster.

A problem can occur where an application provider might not have prior knowledge of specific resource types onboarded on the actual cluster(s), such as for optional features like power-management.

It can be that used resources types like accelerators, single-root input output virtualization (SRIOV), etc., can have some standardized capabilities. For example, there can be a vendor-specific power-manager deployed on a target cluster as a cluster controllers (e.g., custom resources) that can expose different resources based on implementation, and vary from one vendor to another. Using a power-management example, it can be that an application package needs to contain attributes for a vendor-specific (custom resources) power-manager in the application manifest for placement and deployment. This requirement can necessitate that an application provider provides a cluster controller-specific application package, or explores an alternate approach to standardize and abstract all such cluster controllers.

A problem with both of these approaches can be that they are impractical in a multi-cloud environment, and create tight binding between the target environment and the application package.

Additionally, there can be a need for a deployment manager (e.g., a virtual network functions manager (VNFM)) to tune application manifests based on a target cluster's capabilities at a time of deployment, which can free up this decision at the design time.

The present techniques can be implemented to facilitate pre-populating deployment manifests from an application vendor, capability (e.g., power management) modules from a cluster vendor, and a user's policies for capability (e.g., power profile) selection at runtime.

When instantiating an application on a target cluster, a deployment manager can check a catalog for pre-existing deployment modifiers. If none are available, the policy manager can select a most appropriate (or by some other criteria) normalized profile for the cluster type. The deployment manager can use the profile to modify or decorate the deployment descriptor before activating the instantiation request on the cluster.

An advantage of the present techniques can be that they are not technology dependent. That is, they can be applied to different cluster types and different power managers. It can be appreciated that, while the present examples generally relate to CPU power control and optimization, the present techniques can be applied to capabilities offered by clusters.

The present techniques can be implemented to facilitate late-binding of an application in conjunction with infrastructure-specific configurations; that is, infrastructure configuration can be performed in conjunction with application-specific customization.

A default power profile at instantiation time can be provided by an attribute, and a policy to switch between power profiles can be provided along with a VNFD so a VNFM can decide to switch when auto_power_switch is enabled.

The present techniques can also be implemented to facilitate reusability. Where a subsequent instantiation is performed for an application, but for a different cluster type than before, a new modified descriptor can be generated. However, where this second instantiation is being performed for a similar cluster type with similar capabilities, then the pre-existing descriptor can be used in the second instantiation, which can save time and processing resources.

In some examples, components involved in late-binding and package translation can be included in a deployment manager/VNFM controlled by a higher-layer orchestration system, such as a network function virtualization orchestrator (NFVO).

These components can aid with realizing a system where the lower-level cluster capabilities (e.g., cluster controllers) in use need not be standardized or exposed to higher-layer orchestration systems.

The present techniques can be implemented to enable a vendor to provide a common application package irrespective of the cloud capabilities in-place, and reduce a designing and testing overhead.

Example Architectures, Etc.

FIG. 1 illustrates an example system architecture 100 that can facilitate late binding and package translation for multi-cloud deployment, in accordance with an embodiment of this disclosure.

System architecture 100 comprises computer system 102, communications network 104, and cluster 106A and cluster 106B. In turn, computer system 102 comprises late binding and package translation for multi-cloud deployment component 108, and application 110.

System architecture 100 presents one logical example of implementing the present techniques, and it can be appreciated that there can be other example architectures.

Each of computer system 102, cluster 106A, and/or cluster 106B can be implemented with part(s) of computing environment 2000 of FIG. 20. Communications network 104 can comprise a computer communications network, such as the Internet, or an intranet.

In some examples, late binding and package translation for multi-cloud deployment component 108 can facilitate late binding and package translation in instantiating n application (e.g., application 110) on a cluster (e.g., cluster 106A or cluster 106B).

In some examples, late binding and package translation for multi-cloud deployment component 108 can implement part(s) of the signal flows of FIGS. 9-12 and/or the process flows of FIGS. 13-15 to implement late binding and package translation for multi-cloud deployment.

It can be appreciated that system architecture 100 is one example system architecture for late binding and package translation for multi-cloud deployment, and that there can be other system architectures that facilitate late binding and package translation for multi-cloud deployment.

FIG. 2 illustrates an example system architecture 200 for late-binding of an application to a cluster, and that can facilitate late binding and package translation for multi-cloud deployment, in accordance with an embodiment of this disclosure. In some examples, part(s) of system architecture 200 can be used to implement part(s) of system architecture 100 of FIG. 1 to facilitate late binding and package translation for multi-cloud deployment.

System architecture 200 comprises vendor A 202, application 204, descriptor/manifest 206, vendor B 208, infrastructure stack 210 (hardware and software (HW and SW)), orchestrator 212, deployed solution 214, application 216, infrastructure stack 218, and late binding and package translation for multi-cloud deployment component 220 (which can be similar to late binding and package translation for multi-cloud deployment component 108 of FIG. 1).

FIG. 2 generally illustrates an example of "late binding" of an application to a particular infrastructure stack (which can comprise hardware and software). In some examples, late binding can occur at a time that it is determined that a particular application will be deployed to a particular infrastructure stack. Late binding can be viewed in contrast to "early binding," where binding a particular application to a particular infrastructure stack can occur earlier than late binding, such as at a time that an application is developed, or obtained from a vendor.

Performing late binding can result in postponing needing to know other system components until necessary.

FIG. 3 illustrates an example table 300 of cluster capabilities, and that can facilitate late binding and package translation for multi-cloud deployment, in accordance with an embodiment of this disclosure. In some examples, parts of table 300 can reflect parts of prior approaches to application manifests. In some examples, part(s) of table 300 can be used to implement part(s) of system architecture 100 of FIG. 1 to facilitate late binding and package translation for multi-cloud deployment.

Table 300 comprises rows 302, columns 304, and late binding and package translation for multi-cloud deployment component 306 (which can be similar to late binding and package translation for multi-cloud deployment component 108 of FIG. 1). Rows 302 identifies different information elements for enhanced cluster capabilities, and columns 304 provides information about the respective information elements.

In some examples of a network application platform, an application specific descriptor (which can be provided by a vendor/application designer) can expect that the target cluster capabilities (e.g., a custom resources name, version, etc.) are specified as part of a package. This information can be used for placement of the application on a target cluster.

Then, an actual application manifest can have specific resources referenced for fetching similar resources at a time of deployment.

FIG. 4 illustrates an example 400 application manifest, and that can facilitate late binding and package translation for multi-cloud deployment, in accordance with an embodiment of this disclosure. In some examples, part(s) of example 400 can be used to implement part(s) of system architecture 100 of FIG. 1 to facilitate late binding and package translation for multi-cloud deployment.

Example 400 comprises configuration information 402, and late binding and package translation for multi-cloud deployment component 404 (which can be similar to late binding and package translation for multi-cloud deployment component 108 of FIG. 1).

Configuration information 402 can be used to identify parts of table 300 as part of an application identifying target cluster specific capabilities.

FIG. 5 illustrates another example table 500 of cluster capabilities, and that can facilitate late binding and package translation for multi-cloud deployment, in accordance with an embodiment of this disclosure. In some examples, parts of table 500 can reflect parts of prior approaches to application manifests. In some examples, part(s) of table 500 can be used to implement part(s) of system architecture 100 of FIG. 1 to facilitate late binding and package translation for multi-cloud deployment.

Table 500 comprises rows 502, columns 504, and late binding and package translation for multi-cloud deployment component 506 (which can be similar to late binding and package translation for multi-cloud deployment component 108 of FIG. 1). Rows 502 identifies different information elements for enhanced cluster capabilities, and columns 504 provides information about the respective information elements.

The information of table 500 can be similar to that of table 300 of FIG. 3, and presented in a different manner. That is, table 300 and table 500 together can show how different clusters can express their capabilities in different manners.

In table 500, a RequestAdditionalCapability information element where the specific custom resources/additional capability can be expressed with an exact name and version that would be used in the target cluster for the application to work. Using this approach, it can be that there is no abstraction involved, and the application designer should have advanced knowledge of the target cluster capabilities. Table 400 of FIG. 4, and table 500, can generally identify problems with prior approaches that can be addressed through the present techniques.

The present techniques can be implemented to facilitate abstraction and late binding, so that an application package can be provided in an abstract format, without a need of having knowledge of granular cluster-level capabilities.

Using a power manager example, and according to the present techniques, an application package can be designed without a need to know an exact power manager (e.g., a cluster capability that can be provided by a cloud/hardware platform vendor) and its specific workflows and manifests attributes (e.g., component to manage containerized application packages-charts).

The present techniques can be implemented to facilitate using a self-sufficient translator package provided by the same vendor that provides the cluster controller expressed in a descriptive language on implementation specific details of the cluster controller in question.

A virtual network function descriptor (VNFD)/application package provided by the vendor can provide supported C/P-states of their workloads in an abstract format without implementation specific information.

A deployment manager part of a VNFM, which can be responsible for deploying the application on the target cluster, can translate the abstract power-profiles expressed in the application package to a cluster-controller-specific process and manifest, so that the application can be deployed successfully with relevant information required for the cluster-specific power-controller to work.

In some examples, the present techniques can be implemented as follows, using a power management scenario. A temporary_VNFD package can be created that contains modified application manifests based on the abstract power-profiles and actual cluster specific controllers.

Information about cluster-specific controllers can be stored as a capability of a cluster in an infrastructure manager (at the lower-layers) as key: value pairs. For example:

Cluster_Capability {[Power-manager: Intel, version==2.3] [resource-optimizer: Descheduler, version: 3.2.1]}

Before translating values from abstract power profiles, a cluster capability can be fetched to determine a type of power manager, and then a suitable translation package can be fetched from a translator registry.

It can be that certain cluster capabilities require a virtual network function (VNF) and/or application-specific modification (e.g., resource customization). In this scenario, a power-manager new custom profile (e.g., supported C/P-states) can be created on target clusters. So, there can be a customization of the infrastructure based on the application requirements.

Application manifests can be modified based on a specific power-manager deployed on a cluster. In this scenario, an additional attribute can be added in the spec.containers.resources.cpu and spec.containers.limits.cpu to reference a custom profile that was created, as described above. So, there can be a customization of the application manifest based on the infrastructure capability in the target cluster.

Hence, the present techniques can be implemented to facilitate a process of modifying a cluster configuration to suit an application's needs, and modifying application manifests based on cluster capabilities at a deployment time rather than at a design time.

According to the present techniques, this can be fluidly handled without a need for modifying VNFM software, and/or an application package, for a particular set of cluster controllers, because a translator package and a translator can take care of describing the modifications in infrastructure and/or application.

According to the present techniques, adding, updating, and/or modifying translator packages can be handled programmatically, without hardcoding it.

FIG. 6 illustrates an example system architecture 600 for power savings using application specific C/P states tuning, and that can facilitate late binding and package translation for multi-cloud deployment, in accordance with an embodiment of this disclosure. In some examples, part(s) of system architecture 600 can be used to implement part(s) of system architecture 100 of FIG. 1 to facilitate late binding and package translation for multi-cloud deployment.

System architecture 600 comprises orchestrator/service manager and orchestration (SMO) 602, cloud control plane and VNFM 604, cloud-agnostic abstract application package 606, intelligent translation at deployment time 608, cloud capability specific descriptors 610, distributed controllers 612, cluster A 614A, and cluster B 614B.

In turn, cluster A 614A comprises vendor A power manager 616, management node 620, agent 622A, agent 622B, agent 622C, cores 624A, cores 624B, and cores 624C. And, in turn, cluster B 614B comprises vendor B operator 626, and applications 628.

System architecture 600 can illustrate an example of power savings using application-specific C/P states tuning, where late binding is implemented for an application based on whether the application will be run on cluster A 614A or cluster B 614B.

In some examples, central processing unit (CPU) power optimization flow can be implemented as follows. The present techniques can be implemented to avoid a need for a SMO to understand all minor capabilities available in clusters. The present techniques can also be implemented to avoid a situation where a VNFD designer needs to have prior knowledge of a power-manager deployed, and VNF-required profiles to be onboarded.

In some examples, power profiles can be optional, and an application can still be deployed if a power profile is unavailable in VNFD, or if a manager does not exist in a particular cluster.

In some examples, translator configuration files per controller can be provided in a declarative format. A policy manager can be configured to execute workflows provided by a translator. A power manager can be an infrastructure resource that is controlled by an infrastructure manager.

Figure 7:
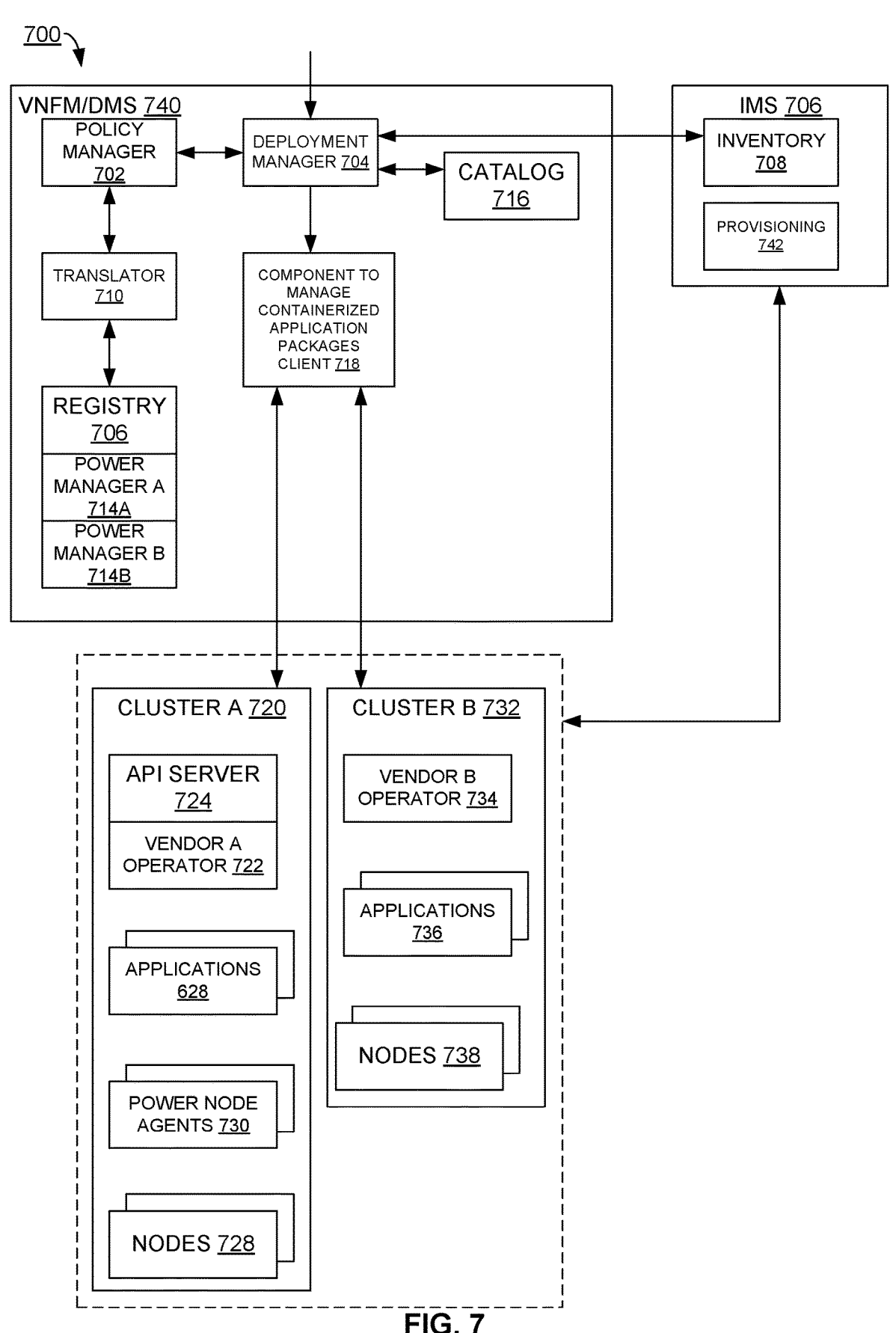
FIG. 7 illustrates an example system architecture for processor power optimization, and that can facilitate late binding and package translation for multi-cloud deployment, in accordance with an embodiment of this disclosure.

FIG. 7 illustrates an example system architecture 700 for processor power optimization, and that can facilitate late binding and package translation for multi-cloud deployment, in accordance with an embodiment of this disclosure. In some examples, part(s) of system architecture 700 can be used to implement part(s) of system architecture 100 of FIG. 1 to facilitate late binding and package translation for multi-cloud deployment.

System architecture 700 comprises policy manager 702, deployment manager 704, infrastructure management services (IMS) 706, inventory 708, translator 710, registry 712, power manager A 714A, power manager B 714B, catalog 716, component to manage containerized application packages client 718, cluster A 720, vendor A operator 722, API server 724, applications 726, nodes 728, power node agents 730, cluster B 732, vendor B operator 734, applications 736, nodes 738, VNFM/deployment management services (DMS) 740, and provisioning 742.

Figure 8:
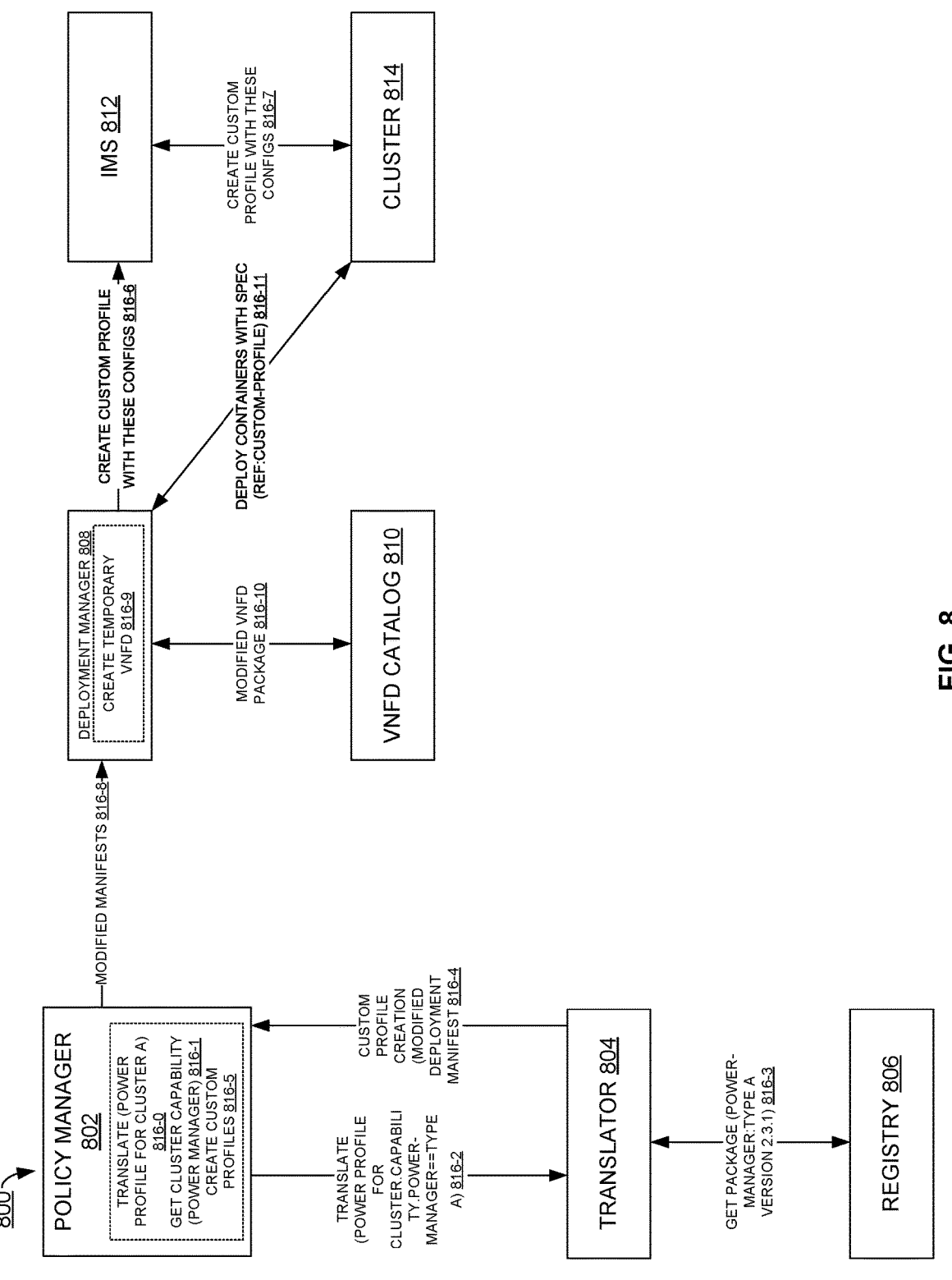
FIG. 8 illustrates an example signal flow for translator and policy manager interactions, and that can facilitate late binding and package translation for multi-cloud deployment, in accordance with an embodiment of this disclosure.

FIG. 8 illustrates an example signal flow 800 for translator and policy manager interactions, and that can facilitate late binding and package translation for multi-cloud deployment, in accordance with an embodiment of this disclosure. In some examples, part(s) of signal flow 800 can be used to implement part(s) of system architecture 100 of FIG. 1 to facilitate late binding and package translation for multi-cloud deployment.

Signal flow 800 comprises policy manager 802, translator 804, registry 806, deployment manager 808, VNFD catalog 810, IMS 812, cluster 814, translate (power profile for cluster A) 816-0, get cluster capability (power manager) 816-1, translate (power profile for cluster.capability.power-manager==Type A) 816-2, get package (power-manager: Type A, version 2.3.1) 816-3, custom profile creation (modified deployment manifest 816-4, create custom profiles 816-5, create custom profile with these configs 816-6, create custom profile with these configs 816-7, modified manifests 816-8, create temporary VNFD 816-9, modified VNFD package 816-10, and deploy containers with spec (ref: custom-profile) 816-11.

In signal flow 800, custom profile creation can be performed where a profile name is created that is used in application manifest modification. In some examples, application manifest modification can be performed before custom profile creation.

Signal flow 800 can illustrate translator and policy manager interactions in implementing examples of the present techniques. Signal flow 800 can illustrate one example signal flow, where there can be other types of implementations of the present techniques. In other, similar examples, different components can perform a signal flow similar to signal flow 800. For example, a policy manager can have control of deployment modifications; a translator can have control of deployment modifications; and/or a deployment manager can have control of deployment modifications.

Figure 9:
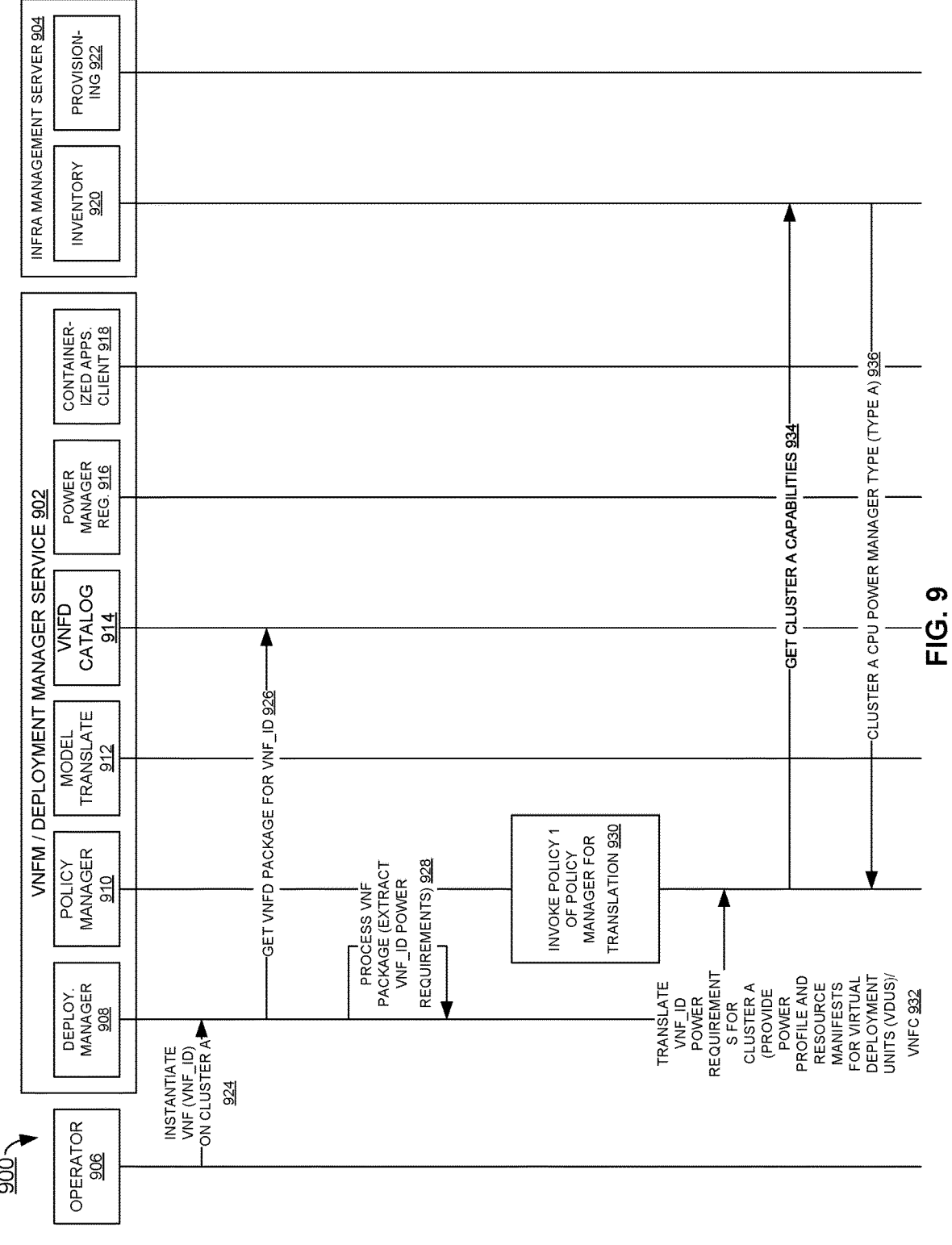
FIG. 9 illustrates an example signal flow that can facilitate late binding and package translation for multi-cloud deployment, in accordance with an embodiment of this disclosure.

FIG. 9 illustrates an example signal flow 900 that can facilitate late binding and package translation for multi-cloud deployment, in accordance with an embodiment of this disclosure.

Figure 10:
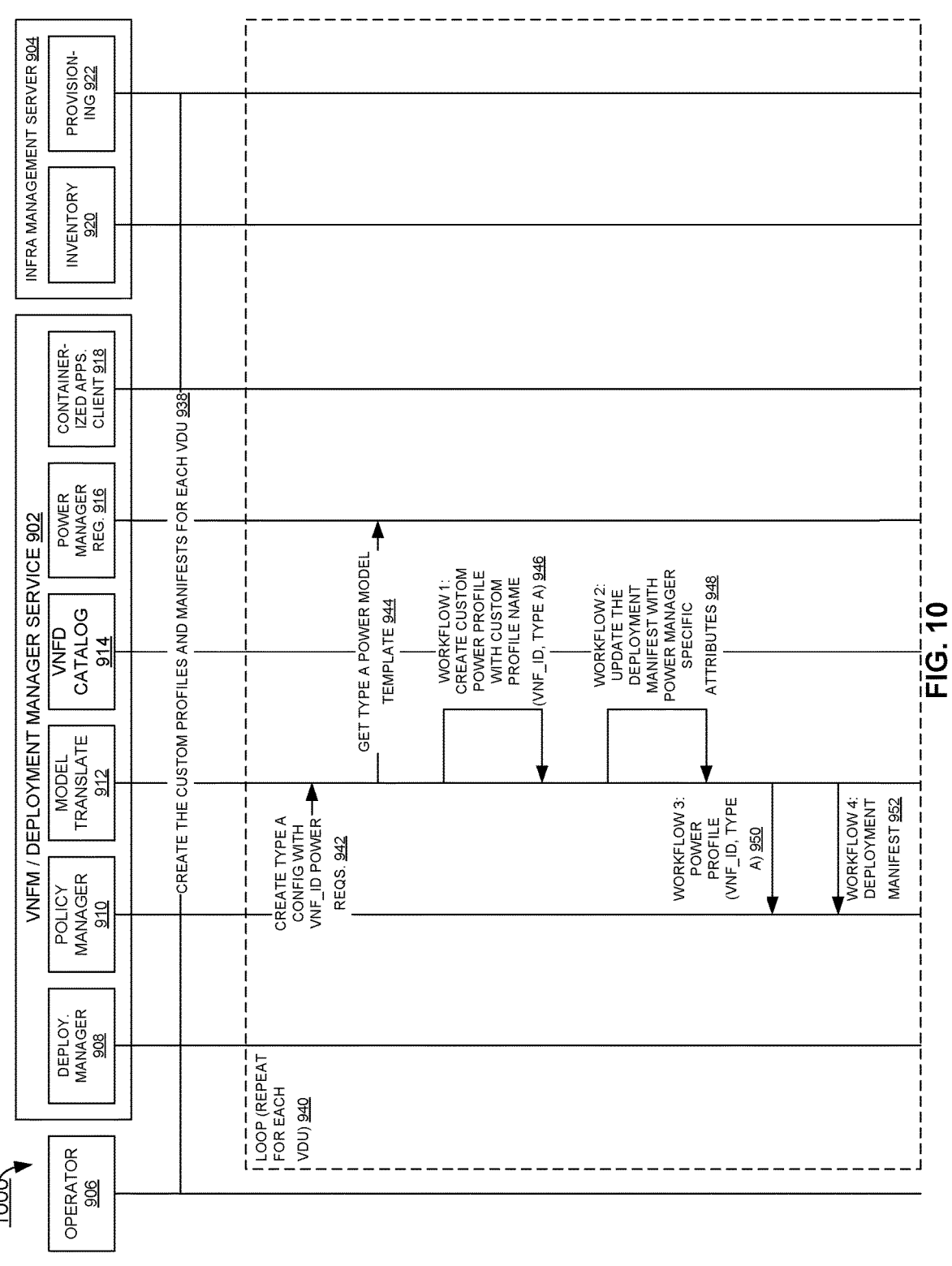
FIG. 10 illustrates more of an example signal flow that can facilitate late binding and package translation for multi-cloud deployment, in accordance with an embodiment of this disclosure.
Figure 11:
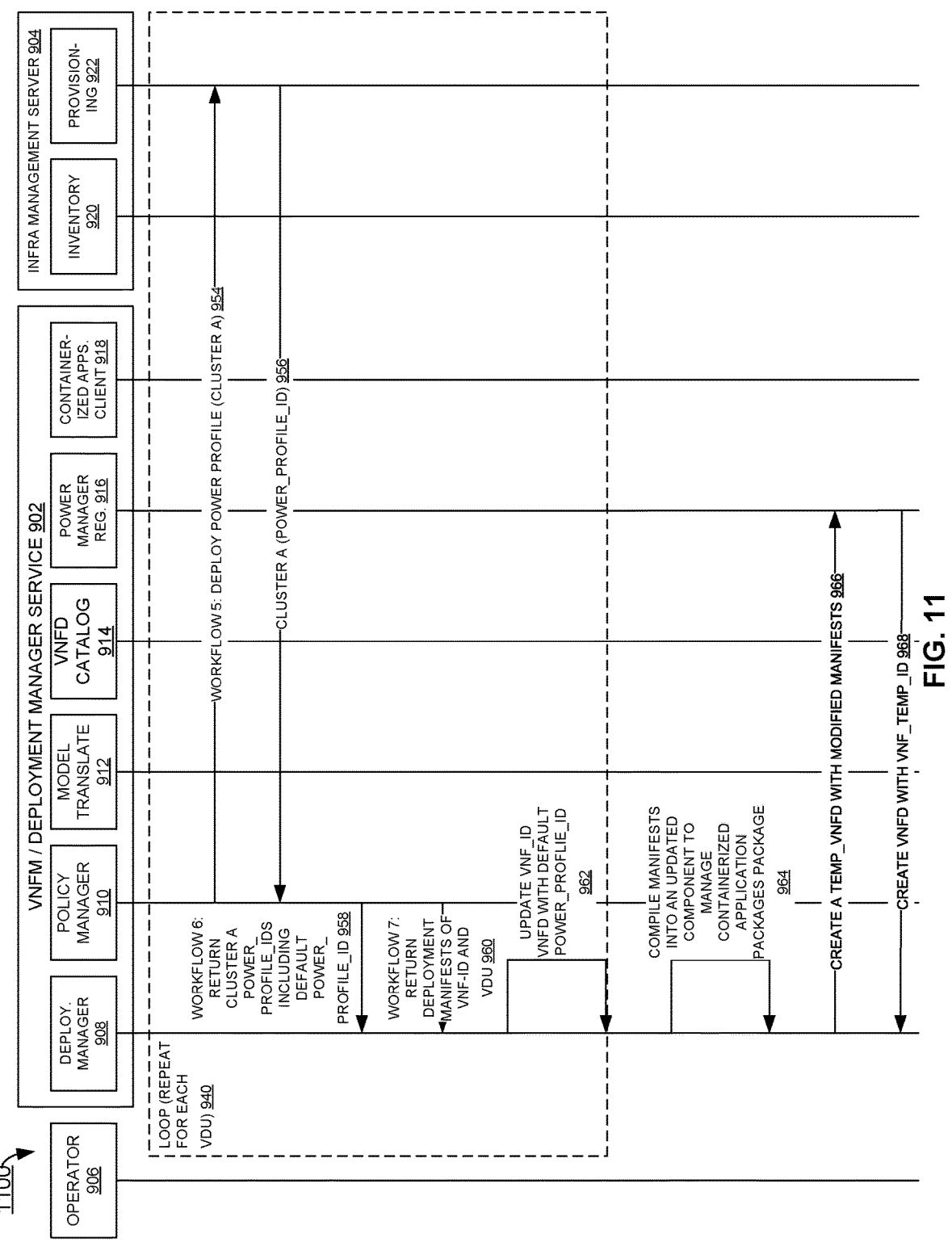
FIG. 11 illustrates more of an example signal flow that can facilitate late binding and package translation for multi-cloud deployment, in accordance with an embodiment of this disclosure.
Figure 12:
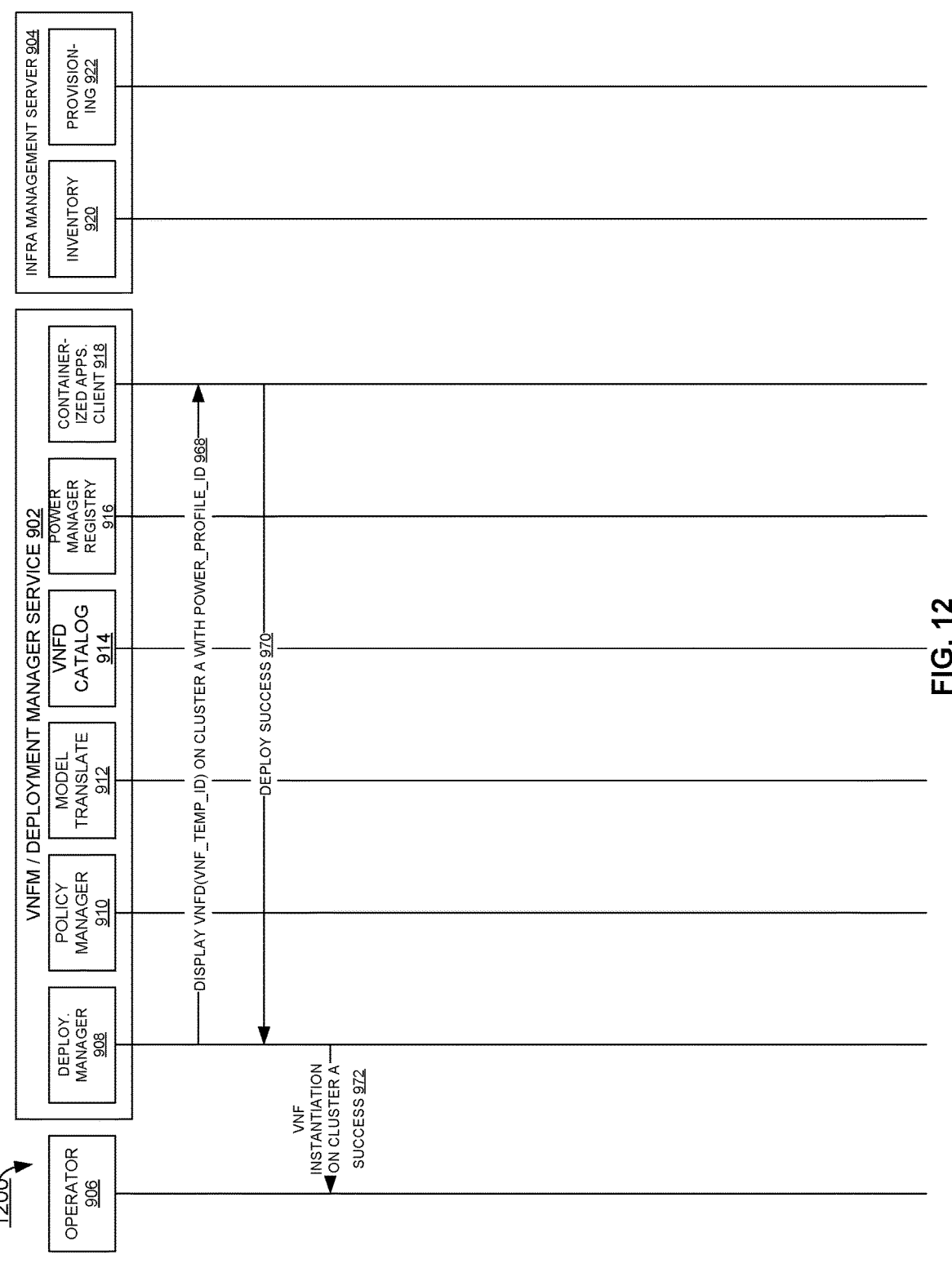
FIG. 12 illustrates more of an example signal flow that can facilitate late binding and package translation for multi-cloud deployment, in accordance with an embodiment of this disclosure.

FIG. 10 illustrates more of an example signal flow 1000 that can facilitate late binding and package translation for multi-cloud deployment, in accordance with an embodiment of this disclosure;

FIG. 11 illustrates more of an example signal flow 1100 that can facilitate late binding and package translation for multi-cloud deployment, in accordance with an embodiment of this disclosure;

FIG. 12 illustrates more of an example signal flow 1200 that can facilitate late binding and package translation for multi-cloud deployment, in accordance with an embodiment of this disclosure;

In some examples, part(s) of signal flows 900, 1000, 1100, and 1200 can be used to implement part(s) of system architecture 100 of FIG. 1 to facilitate late binding and package translation for multi-cloud deployment. It can be that, together, signal flows 900, 1000, 1100, and 1200 can be implemented as a signal flow to facilitate late binding and package translation for multi-cloud deployment.

Signal flows 900, 1000, 1100, and 1200 comprise VNFM/deployment manager service 902, infra management server 904, operator 906, deployment manager 908, policy manager 910, model translate 912, VNFD catalog 914, power manager registry 916, component to manage containerized application packages client 918, inventory 920, provisioning 922, instantiate VNF (vnf_id) on cluster A 924, get VNFD package for vnf_id 926, process VNF package (extract vnf_id power requirements) 928, invoke policy 1 of policy manager for translation 930, translate vnf_id power requirements for cluster A (provide power profile and resource manifests for virtual deployment units (VDUs)/VNFC 932, get cluster A capabilities 934, cluster A CPU power manager type (Type A) 936, create the custom profiles and manifests for each VDU 938, loop (repeat for each VDU) 940, create Type A config with vnf_id power requirements 942, get Type A power model template 944, workflow 1: create custom power profile with custom profile name (vnf_id, Type A)

946, workflow 2: update the deployment manifest with power manager specific attributes 948, workflow 3: power profile (vnf_id, Type A) 950, workflow 4: deployment manifest 952, workflow 5: deploy power profile (cluster A) 954, cluster A (power_profile_id) 956, workflow 6: return cluster A power_profile_ids including default power_profile_id 958, workflow 7: return deployment manifests of VNF-ID and VDU 960, update vnf_id VNFD with default power_proflie_id 962, compile manifests into an updated component to manage containerized application packages package 964, create a temp_VNFD with modified manifests 966, create VNFD with vnf_temp_id 968, deploy VNFD (VNF_temp_id) on cluster A with power_profile_id 970, deploy success 972, and VNF instantiation on cluster A success 974.

Example Process Flows

FIG. 13 illustrates an example process flow 1300 that can facilitate late binding and package translation for multi-cloud deployment, in accordance with an embodiment of this disclosure. In some examples, one or more embodiments of process flow 1300 can be implemented by late binding and package translation for multi-cloud deployment component 108 of FIG. 1, or computing environment 2000 of FIG. 20.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1400 of FIG. 14, and/or process flow 1500 of FIG. 15.

Process flow 1300 begins with 1302, and moves to operation 1304.

Operation 1304 depicts identifying an application package of an application that is configured to execute via a computing platform, wherein the application package comprises a deployment manifest. In some examples, the application package can be for application 204 of FIG. 2, and the deployment manifest can be descriptor/manifest 206.

In some examples, a computing platform (which can be referred to as a cluster), can comprise a group of compute devices with homogeneous characteristics (that is, with similar capabilities, where a workload can be scheduled on any of these compute devices.

In some examples, the application package identifies supported states of the capability for workloads of the application in an abstract format that is independent of implementation-specific information of the selected computing platform. That is, a VNFD/application package provided by a vendor can provide the supported C/P-states of their workloads in an abstract standardized format, and without implementation-specific information.

After operation 1304, process flow 1300 moves to operation 1306.

Operation 1306 depicts modeling respective capabilities of respective computing platforms to produce capability models. In some examples, this can be performed in a similar manner as create Type A config with vnf_id power requirements 942 of FIG. 9.

Modeling a cluster's capability can comprise storing a set of key-value pairs for an array of capabilities in an inventory system. In some examples, a standardized information model can be published (e.g., via a standards organization, or by a single vendor). This model can identify common data types that are available for late-binding optimization. This model can also allow vendor-specific extensions to be defined in a standard format.

In some examples, modeling the respective capabilities of the respective computing platforms to produce the capability models is performed based on information about computer platform-specific controllers, and wherein the information about the computer platform-specific controllers is stored as key-value pairs on a system that implements this process flow. That is, cluster specific controllers can be stored as a capability of the cluster in an infrastructure manager (at lower-layers) as key:value pairs. For example, Cluster_Capability {[Power-manager: Type A, version==2.3] [resource-optimizer: Descheduler, version: 3.2.1]}."

In some examples, modifying the deployment manifest based on the capability to produce the modified deployment manifest comprises selecting a translation package from a group of translation packages that corresponds to the capability, and translating supported states of the capability for workloads of the application in an abstract format in the deployment manifest to a format of the selected computing platform in the modified deployment manifest.

That is, before translating the values from abstract power-profiles, a cluster capability can be fetched to determine its type (e.g., a type of power-manager), and then a suitable translation package can be fetched from a translator registry.

After operation 1306, process flow 1300 moves to operation 1308.

Operation 1308 depicts determining to execute the application via a selected computing platform of the computing platforms. In some examples, the computing platforms can be cluster A 614A and cluster B 614B of FIG. 6, and the selected computing platform can be the one of these clusters on which the application will be instantiated and executed.

In some examples, operations 1310-1316 can be performed based on operation 1308 (e.g., "based on determining to execute the application via a selected computing platform of the computing platforms").

After operation 1308, process flow 1300 moves to operation 1310.

Operation 1310 depicts determining a capability of capabilities of the selected computing platform based on the capability models and the deployment manifest. In some examples, this can be performed in a similar manner as get Type A power model template 944 of FIG. 9.

After operation 1310, process flow 1300 moves to operation 1312.

Operation 1312 depicts modifying the deployment manifest based on the capability to produce a modified deployment manifest. In some examples, this can be performed in a similar manner as workflow 2: update the deployment manifest with power manager specific attributes 948 of FIG. 9.

In some examples, modifying the deployment manifest comprises translating the supported states of the capability for workloads of the application in an identifies supported states of the capability for workloads of the application in an abstract format the abstract format to a format applicable to the selected computing platform. That is, a deployment manager part of a VNFM that is responsible for deploying the application on the target cluster an translate an abstract format (e.g., abstract power-profiles) expressed in the application package to a cluster-controller specific process and manifest so that the application can be deployed successfully with relevant information for the cluster-specific power-controller to work.

In some examples, producing the modified deployment manifest comprises creating a virtual network function descriptor package that comprises the modified deployment manifest, and then instantiating the application via the selected computing platform with the modified deployment manifest comprises instantiating the application with the virtual network function descriptor package. That is, a temporary_VNFD package can be created that contains modified application manifests based on abstract information in a deployment manifest (e.g., abstract power-profiles) and actual cluster specific controllers.

After operation 1312, process flow 1300 moves to operation 1314.

Operation 1314 depicts configuring the capability corresponding to specifications of the application identified in the modified deployment manifest. In some examples, this can be performed in a similar manner as workflow 1: create custom power profile with custom profile name (vnf_id, Type A) 946.

In some examples, operation 1314 can be referred to as configuring a cluster, and configuring the cluster can be performed before modifying the deployment manifest. For example, a computing platform's power manager can be provided with a custom profile based on requirements from an application being installed. In other examples, a modified manifest can be reused on another cluster of the same type, and then a cluster can be modified after the deployment manifest was previously updated for a previous instantiation.

In some examples, configuring the capability corresponding to the specifications of the application identified in the modified deployment manifest comprises performing resource customization on the selected computing platform that corresponds to the specifications of the application. That is, in a scenario, a certain cluster capability can require VNF and/or application specific modifications (that is, resource customization). Using a power manager scenario, new custom profiles (identifying supported C/P-states) can be created on a target cluster. So, there can be a customization of infrastructure based on the application requirements. This can involve providing a custom profile for a capability on a cluster based on requirements specified in an application manifest of an application.

After operation 1314, process flow 1300 moves to operation 1316.

Operation 1316 depicts instantiating the application via the selected computing platform with the modified deployment manifest. In some examples, this can be performed in a similar manner as deploy VNFD(VNF_temp_id) on cluster A with power_profile_id 970 of FIG. 12.

After operation 1316, process flow 1300 moves to 1318, where process flow 1300 ends.

FIG. 14 illustrates an example process flow 1400 that can facilitate late binding and package translation for multi-cloud deployment, in accordance with an embodiment of this disclosure. In some examples, one or more embodiments of process flow 1400 can be implemented by late binding and package translation for multi-cloud deployment component 108 of FIG. 1, or computing environment 2000 of FIG. 20.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 1300 of FIG. 13, and/or process flow 1500 of FIG. 15.

Process flow 1400 begins with 1402, and moves to operation 1404.

Operation 1404 depicts modeling respective capabilities of respective computing platforms to produce capability models. In some examples, operation 1404 can be implemented in a similar manner as operation 1306 of FIG. 13.

After operation 1404, process flow 1400 moves to operation 1406.

Operation 1406 depicts determining to run an application on a selected computing platform of the computing platforms, wherein an application package comprising a deployment manifest is configured to instantiate the application. In some examples, operation 1406 can be implemented in a similar manner as operations 1304 and 1308 of FIG. 13.

In some examples, operations 1408-1414 can be performed based on operation 1406 (e.g., "based on determining to run an application on a selected computing platform of the computing platforms, wherein an application package comprising a deployment manifest is configured to instantiate the application").

After operation 1406, process flow 1400 moves to operation 1408.

Operation 1408 depicts determining a capability of capabilities of the selected computing platform based on the capability models and the deployment manifest. In some examples, operation 1408 can be implemented in a similar manner as operation 1310 of FIG. 13.

After operation 1408, process flow 1400 moves to operation 1410.

Operation 1410 depicts modifying the deployment manifest based on the capability to produce a modified deployment manifest. In some examples, operation 1410 can be implemented in a similar manner as operation 1312 of FIG. 13.

In some examples, modifying the deployment manifest based on the capability to produce the modified deployment manifest comprises modifying the deployment manifest corresponding to resource customization on the selected computing platform that corresponds to the requirements of the application. That is, application manifests can be modified based on a specific capability (e.g., a specific power manager) deployed on a cluster. In a power manager scenario, an additional attribute can be added in spec.containers.resources.cpu and spec.containers.limits.cpu to reference a custom profile. So, there is a customization of the application manifest based on an infrastructure capability in a target cluster.

In some examples, operation 1410 comprises identifying a capability selection policy that corresponds to the application, wherein the modifying of the deployment manifest is performed based on the capability selection policy. That is, a system can be pre-populated with deployment manifests from an application vendor, capability models from a cluster vendor, and user policies for capability selection at runtime.

User polices can comprise a default attribute contained within an application's VNFD, so one power-profile among multiple power-profile defined in the application's VNFD is selected at the time of the deployment.

A user policy can refer to a closed loop policy that comprises triggers, thresholds, and a target capability (e.g., a target power profile) when the application's utilization is within a certain threshold. In this case, the user-policy can be embedded within the application package itself.

Examples of a user-defined policy can include thresholds (modeled values indicating when an action should take place); time/day (schedules when actions should be performed); and QoS/service level objectives (SLOs; SLOs to be met, e.g., power utilization versus traffic throughput).

In some examples, these policies can be defined by an application vendor, an application user, or by a platform vendor. There can be scenarios where there is also a platform user that is independent of the application user (e.g. a public cloud, or a neutral host). It can be that these different stakeholders can have predefined policies that govern desired behaviours to ensure usage that fits an optimality criterion. It can be that these policies can inform a late-binding processes at deployment time.

After operation 1410, process flow 1400 moves to operation 1412.

Operation 1412 depicts configuring the capability corresponding to requirements of the application identified in the modified deployment manifest. In some examples, operation 1412 can be implemented in a similar manner as operation 1314 of FIG. 13.

In some examples, the modifying and the configuring are performed by a translator of a system that implements process flow 1400, and that is separate from a virtual network function manager that is configured to instantiate the application on the selected computing platform. That is, the modifying and the configuring can be handled without the need for modifying VNFM software or an application package for a particular set of cluster controllers, as a translator package and a translator can take care of describing the necessary modifications in infrastructure and application.

After operation 1412, process flow 1400 moves to operation 1414.

Operation 1414 depicts initiating instantiation of the application on the selected computing platform with the modified deployment manifest. In some examples, operation 1414 can be implemented in a similar manner as operation 1316 of FIG. 13.

In some examples, the application is a first application, the capability is a first capability, the application package is a first application package, and the selected computing platform is a first selected computing platform. In such examples, operation 1414 can comprise, based on determining that a second application package identifies a second capability that is omitted by a second selected computing platform of the computing platforms, initiating instantiation of the second application on the second selected computing platform independently of translating a profile that corresponds to the second capability. That is, capabilities (e.g., power profiles) can be optional requirements, and an application can still be deployed if the capability is unavailable in VNFD, or a manager does not exist in the cluster. Put another way, a determination can be made at a deployment manager to not translate a capability if the relevant capability is not supported at the cluster.

In some examples, the application is a first application, the capability is a first capability, and the selected computing platform is a first selected computing platform. In such examples, operation 1414 can comprise initiating instantiation of a second application on a second selected computing platform of the computing platforms, wherein the application package identifies a second capability, and wherein a null capability of a virtual network function descriptor configured to instantiate the second application on the second selected computing platform indicates that the second capability is unavailable on the second selected computing platform.

In some examples, the application is a first application, the capability is a first capability, and the selected computing platform is a first selected computing platform. In such examples, operation 1414 can comprise initiating instantiation of a second application on a second selected computing platform of the computing platforms, wherein a first cluster type of the first selected computing platform that comprises the first capability differs from a second cluster type of the second selected computing platform that comprises a second capability, and wherein the first capability and the second capability comprise different capabilities. That is, an advantage of implementing the present techniques can be that it is technology independent, so can be used for different cluster types, and different capability types (e.g., different types of power managers).

After operation 1414, process flow 1400 moves to 1416, where process flow 1400 ends.

FIG. 15 illustrates an example process flow 1500 that can facilitate late binding and package translation for multi-cloud deployment, in accordance with an embodiment of this disclosure. In some examples, one or more embodiments of process flow 1500 can be implemented by late binding and package translation for multi-cloud deployment component 108 of FIG. 1, or computing environment 2000 of FIG. 20.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of process flow 1300 of FIG. 13, and/or process flow 1400 of FIG. 14.

Process flow 1500 begins with 1502, and moves to operation 1504.

Operation 1504 depicts modeling a capability of a cluster of a group of clusters to produce a capability model. In some examples, operation 1504 can be implemented in a similar manner as operation 1306 of FIG. 13.

After operation 1504, process flow 1500 moves to operation 1506.

Operation 1506 depicts based on determining to instantiate an application via the cluster, wherein an application package comprising a deployment manifest is configured to instantiate the application, determining a capability of capabilities of the cluster based on the capability model and the deployment manifest. In some examples, operation 1506 can be implemented in a similar manner as operations 1304 and 1308-1310 of FIG. 13.

In some examples, the application package identifies supported states of the capability for workloads of the application in an abstract format that is independent of implementation-specific information of the cluster.

After operation 1506, process flow 1500 moves to operation 1508.

Operation 1508 depicts modifying the deployment manifest based on the capability to produce a modified deployment manifest. In some examples, operation 1508 can be implemented in a similar manner as operation 1312 of FIG. 13.

In some examples, producing the modified deployment manifest comprises creating a virtual network function descriptor package that comprises the modified deployment manifest, and instantiating the application via the cluster with the modified deployment manifest comprises instantiating the application with the virtual network function descriptor package.

In some examples, modifying the deployment manifest comprises translating the supported states of the capability for workloads of the application in the abstract format to a format of the cluster.

In some examples, modifying the deployment manifest based on the capability to produce the modified deployment manifest comprises, based on an abstract profile of the deployment manifest that corresponds to the capability, and an identification of the cluster, selecting a translation package from a group of stored translation packages, and modifying the abstract profile based on the translation package.

That is, a translator can customize a cluster and an application manifest when translation is appropriate. A deployment manager can use the translator package and workflow contained within it to customize cluster controllers and an application manifest to facilitate a successful application deployment on a cluster tuned for its performance.

After operation 1508, process flow 1500 moves to operation 1510.

Operation 1510 depicts configuring the capability corresponding to operational characteristics of the application identified in the modified deployment manifest. In some examples, operation 1510 can be implemented in a similar manner as operation 1312 of FIG. 13.

After operation 1510, process flow 1500 moves to operation 1512.

Operation 1512 depicts initiating instantiation of the application via the cluster with the modified deployment manifest. In some examples, operation 1512 can be implemented in a similar manner as operation 1316 of FIG. 13.

In some examples instantiation of the application is a first instantiation of a first application, the cluster is a first cluster, and operation 1512 comprises, as part of initiating a second instantiation of a second application on a second cluster of the group of clusters, determining to instantiate the second application with a normalized profile for a type of the second selected cluster based on failing to identify a pre-existing deployment modifier that corresponds to the application and the second cluster. That is, it can be that when a user requests instantiation of an application on a target cluster, a deployment manager can check a catalogue for pre-existing deployment modifiers. If none are available, a policy manager can select a normalized profile for the cluster type (which can be a most appropriate normalized profile for the cluster type). The deployment manager can use the profile to modify or decorate the deployment descriptor before activating the instantiation request on the cluster.

It can be that translation and temporary package creation is performed every time a new instance of an application using the same VNFD package in the same cluster is instantiated. In order to optimize and reduce the time required to do a translation of the package, certain parts in this process can be avoided if there are subsequent instantiation requests for an application deployed on the same cluster using similar cluster capabilities.

After operation 1512, process flow 1500 moves to 1514, where process flow 1500 ends.

Example Architectures, Etc.

There can be a problem where an application and its workloads are currently deployed with a configuration (e.g., a power profile), but the traffic and utilization of the application that were projected for the configuration can change over time. That is, it can be that applications and their workloads can be characterized by alternating periods of high and low utilization.

An application can comprise multiple components and/or microservices. Each component/microservice that is part of an application can have multiple configurations (e.g., multiple power profiles), with corresponding abstract values, defined as part of an application package. A default configuration can be considered when instantiating each component/microservice of an application.

It can be that, during a period of low utilization, a default profile (which can generally be defined for high performance) is not efficient. Therefore, there can be a desire to closely watch an application's utilization to select an appropriate configuration that is predefined in a provided application package.

It can be desired that the closed loop actions (e.g., switching configurations) does not result in any service outage or performance degradation. It can also be considered that not all configuration changes on infrastructure resources on which the application/workload is deployed are dynamically modifiable. A closed loop action can indicate that a system is autonomous and complete—that is, a decision process can be completed without involving external actors. In some examples, external actors can influence outcomes by configuring policies, etc., but do not participate directly at a time of making a decision. So, components can be implemented that are configured to handle decision requests, process data from multiple sources, and respond with a reliable result.

In contrast to open loops, where outside actors are involved in a decision-making process at a time of making that decision, the present techniques with a closed loop can be implemented to improve decision cycle times and to lower a cost inherent in transporting data outside of a system. It can be that, comparatively, open loop policy-based systems can be less reliable and responsive.

To overcome these problems with deploying applications/workloads, the present techniques can be implemented to facilitate a closed-loop policy that comprises rules delivered by an application provider on a configuration that is suitable for utilization of an application.

A policy can comprise logic to select between profiles. Using a power profile example, a policy can comprise power-in and power-out logics—that is, logic, triggers, and actions to move from a default power profile to a predefined power savings profile (power-in) and vice versa (power out). "Power in" (to invoke power savings, to enter into a higher power-savings state) and "power out" (to reduce power savings, to exit from a higher power-savings state) can be terms that are similar to "scale in" and "scale out" (which can refer to scaling a system).

An action recommended by an entity executing a policy (e.g., a policy manager) can be applied directly to infrastructure resources that the microservices of an application are currently using directly in the form of a config update. This can avoid a need to redeploy the microservices (or pods in which the microservices execute), as it can be that there are no changes to the application manifest. Rather the configurations (e.g., power profile configurations) can be updated by a deployment manager. This behavior can be supplied as an attribute (e.g., 1. redeployment: on/off) in a translator package as it can be that a cluster capability provider can have a better understanding of whether a redeployment is recommended. In an example, redeployment can be turned off to avoid redeployment of pods.

A translator package can comprise one or more, single or multi-variable attributes (e.g., 1. Auto; 2: On/Off; 3: Disabled) that conveys whether a particular controller (e.g., a power manager) supports dynamic configuration changes when workloads are actively running on them. This can ensure that, though an application package (which can lack knowledge of a controller/cluster capability in use) supports a profile change when required, if an underlying controller/cluster capability does not recommend such changes, then such recommendations from a policy manager can be ignored by a deployment manager.

The following can be generally implemented in prior approaches, while the present techniques can extend it for autonomous power management. VNF modification flow can be supported based on configurable properties of a VNF instance, without a need to redeploy the VNF instance to enable auto-scaling and auto-healing of that VNF instance. The present techniques can be implemented to extend a VNF modification flow to facilitate autonomous management (e.g., auto power management) of a particular VNF instance, which could have been disabled at a time of instantiation. A deployment manager can activate an autonomous management closed loop policy for a particular VNF instance based on a VNF modification request. In other examples, a closed loop can be enabled by default at a time of instantiation. That is, there can be an option to enable them later based on demand.

Based on a closed loop policy definition, application usage and telemetry can be monitored, and when the usage becomes lower than a defined threshold for a particular amount of time, the defined action can be implemented. Using a power management example, the defined action can be powered-in where a change is made from a default profile to a power savings profile.

The deployment manager can receive a recommendation from a policy manager to check with a translator package about whether an autonomous closed loop action attribute is permitted for the given cluster capability. If it is not allowed, then the recommendation can be rejected and feedback can be sent to the policy manager.

If it is allowed, then the deployment manager can check a translator package to determine if redeployment is allowed. Based on the attribute, a further course of action can be determined by the deployment manager. These operations can be performed at a time of initial instantiation, where attributes can be fetched from a translator package and stored as metadata for a VNFD package to be used later when a closed loop is enabled.

If a closed loop is permitted, a recommendation from the policy manager that comprises a target profile (e.g., a target power profile) can be actuated (e.g., values corresponding to a target power profile can be taken from the deployment manager's data store and overridden in a custom power profile file that was created at a time of instantiation. The profile name of the profile in the custom power profile file can remain the same, but the values can be overridden with the values available in the target power profile.

The modified custom profile file can be sent to IMS to be applied in the target cluster. The IMS can deploy the custom profile file, which can have an effect of a configuration update of the cluster capability that was already in place.

The computing cores associated with the relevant workloads can be modified per this latest configuration, without a need to redeploy the workload.

The closed loop procedure can be successfully completed, and the application utilization can be further monitored to determine whether a configuration change (e.g., a power out policy) is triggered when utilization increases.

FIG. 16 illustrates an example power profiles definition 1600, and that can facilitate late binding and package translation for multi-cloud deployment, in accordance with an embodiment of this disclosure. In some examples, part(s) of power profiles definition 1600 can be used to implement part(s) of system architecture 100 of FIG. 1 to facilitate late binding and package translation for multi-cloud deployment.

System architecture 1600 comprises power profiles definition 1602 and late binding and package translation for multi-cloud deployment component 1604 (which can be similar to late binding and package translation for multi-cloud deployment component 108 of FIG. 1).

FIG. 16 illustrates an example of a power profiles definition in an application package. Abstract values can be included as part of a VNFD. A closed loop can define policies to change a default power profile from performance to power-savings when a certain utilization threshold is reached.

Figure 17:
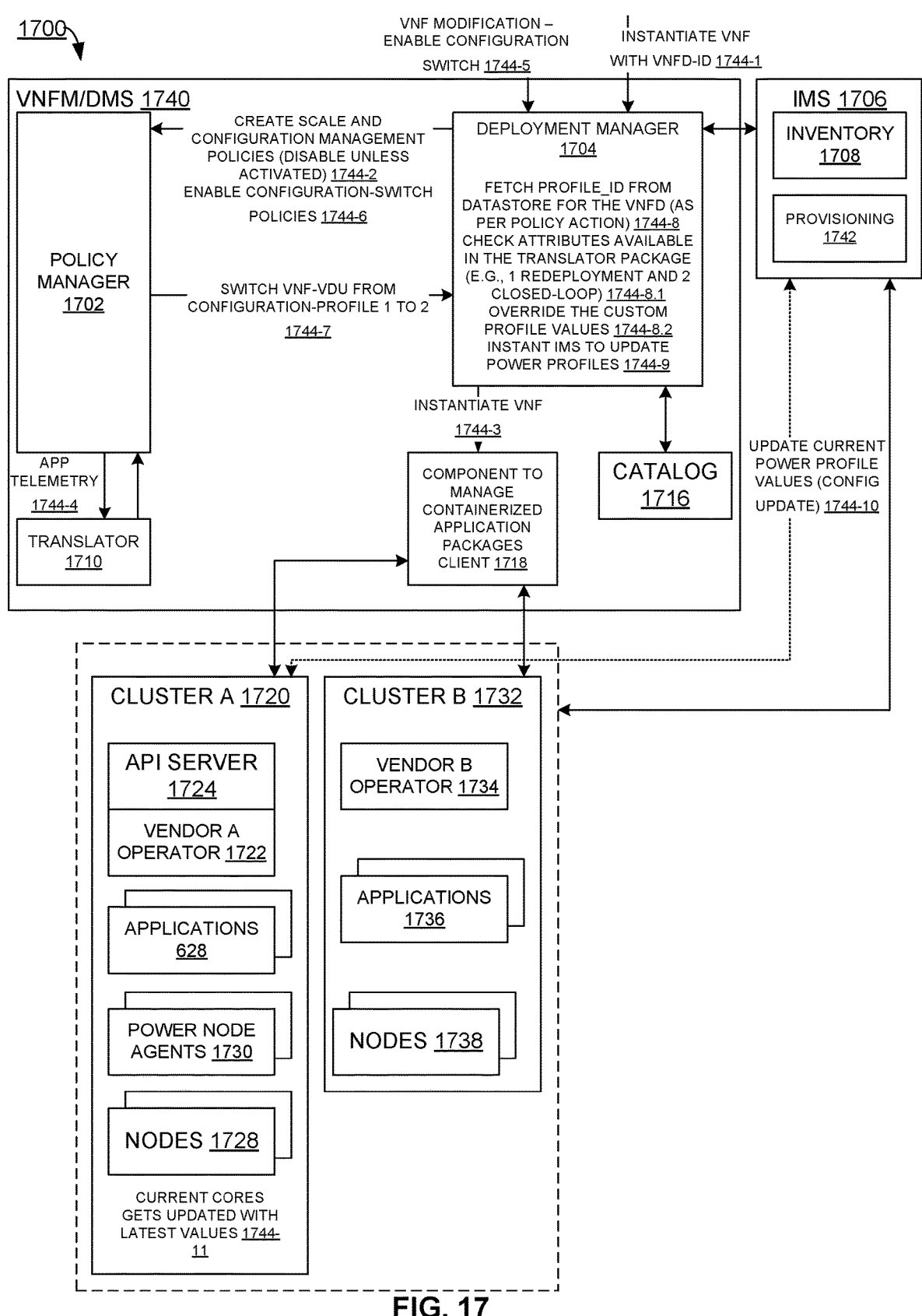
FIG. 17 illustrates an example system architecture for dynamic configuration switching, and that can facilitate late binding and package translation for multi-cloud deployment, in accordance with an embodiment of this disclosure.

FIG. 17 illustrates an example system architecture 1700 for dynamic configuration switching, and that can facilitate late binding and package translation for multi-cloud deployment, in accordance with an embodiment of this disclosure. In some examples, part(s) of system architecture 1700 can be used to implement part(s) of system architecture 100 of FIG. 1 to facilitate late binding and package translation for multi-cloud deployment.

System architecture 1700 comprises policy manager 1702, deployment manager 1704, infrastructure IMS 1706, inventory 1708, translator 1710, catalog 1716, component to manage containerized application packages client 1718, cluster A 1720, vendor A operator 1722, API server 1724, applications 1726, nodes 1728, power node agents 1730, cluster B 1732, vendor B operator 1734, applications 1736, nodes 1738, VNFM/deployment management services (DMS) 1740, and provisioning 1742.

System architecture 1700 also comprises various signal flows:

instantiate VNF with VNFD-ID 1744-1 create scale and configuration management policies (disable unless activated) 1744-2 instantiate VNF 1744-3 app telemetry 1744-4

VNF modification-enable configuration switch 1744-5 enable configuration-switch policies 1744-6 switch VNF-VDU from configuration-profile 1 to 2 1744-7 fetch profile_ID from datastore for the VNFD (as per policy action) 1744-8 check attributes available in the translator package (e.g., 1 redeployment and 2 closed-loop) 1744-8.1 override the custom profile values 1744-8.2 instant IMS to update power profiles 1744-9 update current power profile values (config update) 1744-10 current cores gets updated with latest values 1744-11

Among other operations in FIGS. 17, 1744-5, 1744-8, 1744-8.1, 1744-8.2, 1744-9, and 1744-10 can be new relative to prior approaches, and the entire flow of operations (as well as subsets of the flow of operations) can be new relative to prior operations.

The present techniques can be implemented to facilitate the following. The present techniques can be implemented to facilitate multiple profiles (e.g., power profiles) for one or more VNF components in a VNFD defined in an abstract manner, which can be triggered based on closed loop rules.

A VNF modification flow can be extended from auto scaling and auto healing (which can generally according to some existing standards) to automatically performing other functions (like auto power management).

A deployment manager can use an attribute available in a translator package to determine on further processing in a closed loop action. This can facilitate separating concerns—e.g., a translator package provided by a vendor that provides a configuration manager (e.g., a power manager) that enables/disables a closed loop, while an application package provider can avoid worrying about an exact configuration manager that will be used in a particular cluster.

A deployment manager using an attribute available in a translator package can decide between reconfiguration and redeployment of an application/workload. Based on an attribute, it can be that VNF component redeployment can be avoided by modifying a configuration of infrastructure.

These techniques can be implemented for central processing unit power control and optimization, as well as other deployment optimization scenarios.

FIG. 18 illustrates an example system architecture 1800 for instantiating an application on a cluster type a first time, and that can facilitate late binding and package translation for multi-cloud deployment, in accordance with an embodiment of this disclosure. In some examples, part(s) of system architecture 1800 can be used to implement part(s) of system architecture 100 of FIG. 1 to facilitate late binding and package translation for multi-cloud deployment.

System architecture 1800 comprises deployment manager 1802, VNF package (VNFD and charts) 1804, VNF package (VNFD and modified charts) 1806, cluster 1808, and IMS 1810.

System architecture 1800 also comprises various signal flows:

instantiation (VNFD ID and runtime params) 1812-1.1
  get VNFD 1812-1.2
  translator package 1812-1.3
  add custom profiles (modify infra config) 1812-1.4
  store modified VNFD 1812-1.5
  instantiate with modified VNFD 1812-1.6
  instantiate on cluster 1812-1.7
  instantiation (VNFD ID and runtime params) 1812-2.1

System architecture 1800 comprises deployment manager 1802, VNF package (VNFD and charts) 1804, VNF package (VNFD and modified charts) 1806, cluster 1808, and IMS 1810.

Figure 19:
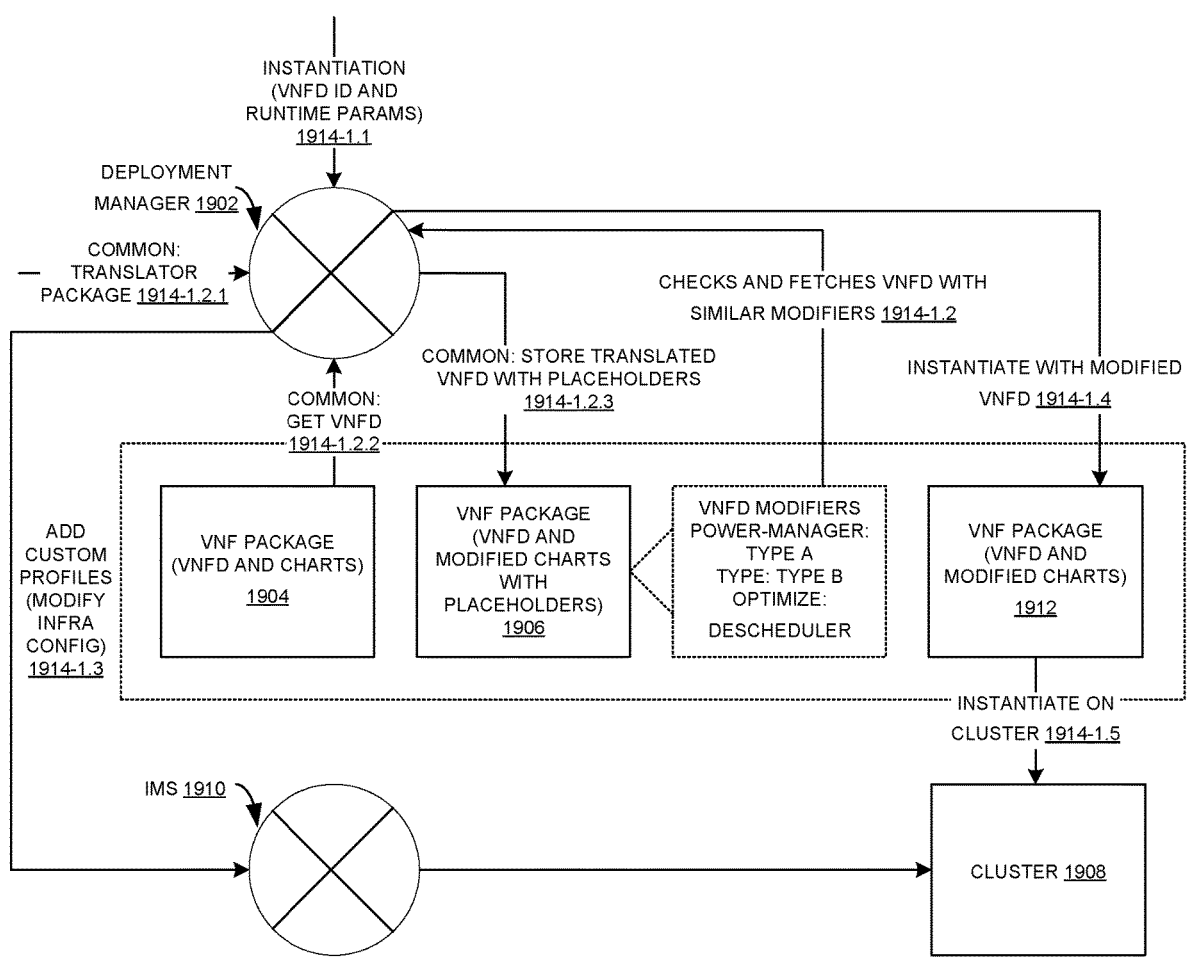
FIG. 19 illustrates an example system architecture for instantiating an application on a cluster type a subsequent time, and that can facilitate late binding and package translation for multi-cloud deployment, in accordance with an embodiment of this disclosure.

Generally, FIG. 18 illustrates an unoptimized flow where there is no reusability (in contrast to the reusability illustrated in FIG. 19). For one instantiation request, 1812-1.1 through 1812-1.7 can be performed. Then, for a subsequent instantiation request, that entire process can be repeated (indicated by instantiation (VNFD ID and runtime params) 1812-2.1, which can be similar to 1812-1.1), which can be less efficient compared to the reusability techniques illustrated in FIG. 19.

FIG. 19 illustrates an example system architecture 1900 for instantiating an application on a cluster type a subsequent time, and that can facilitate late binding and package translation for multi-cloud deployment, in accordance with an embodiment of this disclosure. In some examples, part(s) of system architecture 1900 can be used to implement part(s) of system architecture 100 of FIG. 1 to facilitate late binding and package translation for multi-cloud deployment.

In contrast to FIG. 18, which illustrates an example that does not implement reusability in application instantiation, in FIG. 19, there can be reusability in application instantiation for a similar cluster type.

System architecture 1900 comprises deployment manager 1902, VNF package (VNFD and charts) 1904, VNF package (VNFD and modified charts with placeholders) 1906, cluster 1908, IMS 1910, and VNF package (VNFD and modified charts) 1912. System architecture 1900 also comprises various signal flows:

instantiation (VNFD ID and runtime params) 1914-1.1
  checks and fetches VNFD with similar modifiers 1914-1.2
  common: translator package 1914-1.2.1
  common: get VNFD 1914-1.2.2
  common: store translated VNFD with placeholders 1914-1.2.3
  add custom profiles (modify infra config) 1914-1.3
  instantiate with modified VNFD 1914-1.4
  instantiate on cluster 1914-1.5

Certain of these signal flows can be noted as "common" because they are similar to corresponding signal flows in FIG. 18. It can be that the signal flows of FIG. 18 can be used to instantiate an application on a cluster a first time. Then, the signal flows of FIG. 19 can be used to reuse parts of FIG. 18, where the same application of FIG. 18 is instantiated on a different cluster type.

The present techniques can facilitate reusability. That is, where a user requests a subsequent instantiation for a same application but for a different cluster type, a new modified descriptor can be generated. Where it is the same application for a similar cluster type and similar capabilities, a preexisting descriptor can be used, saving on processing delay.

Example Operating Environment

In order to provide additional context for various embodiments described herein, FIG. 20 and the following discussion are intended to provide a brief, general description of a suitable computing environment 2000 in which the various embodiments of the embodiment described herein can be implemented.

For example, parts of computing environment 2000 can be used to implement one or more embodiments of computer system 102, cluster 106A, and/or cluster 106B.

In some examples, computing environment 2000 can implement one or more embodiments of the signal flows of FIGS. 9-12 and/or the process flows of FIGS. 13-15 to facilitate late binding and package translation for multi-cloud deployment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments described herein comprises processing unit 2002, system memory 2004, power supply unit 2006, accelerator 2008, network adapter 2010, bus 2012, operating system 2014, device drivers 2016, data 2018, applications 2020, infrastructure manager 2022, deployment manager 2024, policy manager 2026, and other modules 2028.

The system bus 2012 couples system components including, but not limited to, the system memory 2004 to the processing unit 2002. The processing unit 2002 can be any of various commercially available processors. Dual microprocessors and other multi-processor architectures can also be employed as the processing unit 2002.

The system bus 2012 can be any of several types of bus structure that can further interconnect to a memory bus (with or without a memory controller), a peripheral bus, and a local bus using any of a variety of commercially available bus architectures. The system memory 2004 can include ROM and RAM. A basic input/output system (BIOS) can be stored in a nonvolatile storage such as ROM, erasable programmable read only memory (EPROM), EEPROM, which BIOS contains the basic routines that help to transfer information between elements within a computer of computing environment 2000, such as during startup. The RAM can also include a high-speed RAM such as static RAM for caching data.

The drives and their associated computer-readable storage media provide nonvolatile storage of data, data structures, computer-executable instructions, and so forth. For a computer of computing environment 2000, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM, including an operating system 2014, device drivers 2016, data 2018, and applications 2020. All or portions of the operating system, applications, modules, and/or data can also be cached in RAM. The systems and methods described herein can be implemented utilizing various commercially available operating systems or combinations of operating systems.

Computing environment 2000 can optionally comprise emulation technologies. For example, a hypervisor (not shown) or other intermediary can emulate a hardware environment for operating system 2014, and the emulated hardware can optionally be different from the hardware illustrated in FIG. 20. In such an embodiment, operating system 2014 can comprise one virtual machine (VM) of multiple VMs hosted at computer 2002. Furthermore, operating system 2014 can provide runtime environments, such as the Java runtime environment or the .NET framework, for applications 2020. Runtime environments are consistent execution environments that allow applications 2020 to run on any operating system that includes the runtime environment. Similarly, operating system 2014 can support containers, and applications 2020 can be in the form of containers, which are lightweight, standalone, executable packages of software that include, e.g., code, runtime, system tools, system libraries and settings for an application.

Further, computing environment 2000 can be enabled with a security module, such as a trusted processing module (TPM). For instance, with a TPM, boot components hash next in time boot components, and wait for a match of results to secured values, before loading a next boot component. This process can take place at any layer in the code execution stack of computing environment 2000, e.g., applied at the application execution level or at the operating system (OS) kernel level, thereby enabling security at any level of code execution.

A user can enter commands and information into the computing environment 2000 through one or more wired/wireless input devices, e.g., a keyboard, a touch screen, and a pointing device, such as a mouse. Other input devices can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2002 through an input device interface that can be coupled to the system bus 2012, but can be connected by other interfaces, such as a parallel port, an IEEE 1394 serial port, a game port, a USB port, an IR interface, a BLUETOOTH® interface, etc.

A monitor or other type of display device can be also connected to the system bus 2012 via an interface, such as a video adapter. In addition to the monitor, a computer can include other peripheral output devices (not shown), such as speakers, printers, etc.

Computing environment 2000 can operate in a networked environment using logical connections via wired and/or wireless communications to one or more remote computers, such as a remote computer(s). The remote computer(s) can be a workstation, a server computer, a router, a personal computer, portable computer, microprocessor-based entertainment appliance, a peer device or other common network node, and typically includes many or all of the elements described relative to the computing environment 2000, although, for purposes of brevity, only a memory/storage device is illustrated. The logical connections depicted include wired/wireless connectivity to a local area network (LAN) and/or larger networks, e.g., a wide area network (WAN). Such LAN and WAN networking environments are commonplace in offices and companies, and facilitate enterprise-wide computer networks, such as intranets, all of which can connect to a global communications network, e.g., the Internet.

When used in a LAN networking environment, the computing environment 2000 can be connected to the local network through a wired and/or wireless communication network interface or adapter. The adapter can facilitate wired or wireless communication to the LAN, which can also include a wireless access point (AP) disposed thereon for communicating with the adapter in a wireless mode.

When used in a WAN networking environment, the computing environment 2000 can include a modem or can be connected to a communications server on the WAN via other means for establishing communications over the WAN, such as by way of the Internet. The modem, which can be internal or external and a wired or wireless device, can be connected to the system bus 2012 via the input device interface. In a networked environment, program modules depicted relative to the computing environment 2000 or portions thereof, can be stored in the remote memory/storage device. It will be appreciated that the network connections shown are examples, and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computing environment 2000 and a cloud storage system can be established over a LAN or 2056 e.g., by the adapter or modem, respectively. Upon connecting the computing environment 2000 to an associated cloud storage system, the external storage interface can, with the aid of the adapter and/or modem, manage storage provided by the cloud storage system as it would other types of external storage. For instance, the external storage interface 206 can be configured to provide access to cloud storage sources as if those sources were physically connected to the computing environment 2000.

The computing environment 2000 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Computing environment 2000 can comprise infrastructure manager 2022, deployment manager 2024, policy manager 2026, and other modules 2028, which can be utilized to implement the present techniques.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      identifying an application package of an application that is configured to execute via a computing platform, wherein the application package comprises a deployment manifest;
      modeling respective capabilities of respective computing platforms to produce capability models; and
      based on determining to execute the application via a selected computing platform of the computing platforms,
         determining a capability of capabilities of the selected computing platform based on the capability models and the deployment manifest,
         modifying the deployment manifest based on the capability to produce a modified deployment manifest,
         configuring the capability corresponding to specifications of the application identified in the modified deployment manifest, and
         instantiating the application via the selected computing platform with the modified deployment manifest.

2. The system of claim 1, wherein the application package identifies supported states of the capability for workloads of the application in an abstract format that is independent of implementation-specific information of the selected computing platform.

3. The system of claim 2, wherein modifying the deployment manifest comprises:
   translating the supported states of the capability for workloads of the application in the abstract format to a format applicable to the selected computing platform.

4. The system of claim 1, wherein producing the modified deployment manifest comprises:
   creating a virtual network function descriptor package that comprises the modified deployment manifest, and wherein instantiating the application via the selected computing platform with the modified deployment manifest comprises instantiating the application with the virtual network function descriptor package.

5. The system of claim 1, wherein modeling the respective capabilities of the respective computing platforms to produce the capability models is performed based on information about computer platform-specific controllers, and wherein the information about the computer platform-specific controllers is stored as key-value pairs on the system.

6. The system of claim 1, wherein modifying the deployment manifest based on the capability to produce the modified deployment manifest comprises:

selecting a translation package from a group of translation packages that corresponds to the capability; and translating supported states of the capability for workloads of the application in an abstract format in the deployment manifest to a format of the selected computing platform in the modified deployment manifest.

7. The system of claim 1, wherein configuring the capability corresponding to the specifications of the application identified in the modified deployment manifest comprises:

performing resource customization on the selected computing platform that corresponds to the specifications of the application.

8. A method, comprising:

modeling, by a system comprising at least one processor, respective capabilities of respective computing platforms to produce capability models; and based on determining to run an application on a selected computing platform of the computing platforms, wherein an application package comprising a deployment manifest is configured to instantiate the application, determining, by the system, a capability of capabilities of the selected computing platform based on the capability models and the deployment manifest, modifying, by the system, the deployment manifest based on the capability to produce a modified deployment manifest, configuring, by the system, the capability corresponding to requirements of the application identified in the modified deployment manifest, and initiating, by the system, instantiation of the application on the selected computing platform with the modified deployment manifest.

9. The method of claim 8, wherein modifying the deployment manifest based on the capability to produce the modified deployment manifest comprises:

modifying the deployment manifest corresponding to resource customization on the selected computing platform that corresponds to the requirements of the application.

10. The method of claim 8, wherein the modifying and the configuring are performed by a translator of the system that is separate from a virtual network function manager that is configured to instantiate the application on the selected computing platform.

11. The method of claim 8, further comprising:

identifying, by the system, a capability selection policy that corresponds to the application, wherein the modifying of the deployment manifest is performed based on the capability selection policy.

12. The method of claim 8, wherein the application is a first application, wherein the capability is a first capability, wherein the application package is a first application package, wherein the selected computing platform is a first selected computing platform, and further comprising:

based on determining that a second application package identifies a second capability that is omitted by a second selected computing platform of the computing platforms, initiating, by the system, instantiation of the second application on the second selected computing platform independently of translating a profile that corresponds to the second capability.

13. The method of claim 8, wherein the application is a first application, wherein the capability is a first capability, wherein the selected computing platform is a first selected computing platform, and further comprising:

initiating, by the system, instantiation of a second application on a second selected computing platform of the computing platforms, wherein the application package identifies a second capability, and wherein a null capability of a virtual network function descriptor configured to instantiate the second application on the second selected computing platform indicates that the second capability is unavailable on the second selected computing platform.

14. The method of claim 8, wherein the application is a first application, wherein the capability is a first capability, wherein the selected computing platform is a first selected computing platform, and further comprising:

initiating, by the system, instantiation of a second application on a second selected computing platform of the computing platforms, wherein a first cluster type of the first selected computing platform that comprises the first capability differs from a second cluster type of the second selected computing platform that comprises a second capability, and wherein the first capability and the second capability comprise different capabilities.

15. A non-transitory computer-readable medium comprising instructions that, in response to execution, cause a system comprising at least one processor to perform operations, comprising:

modeling a capability of a cluster of a group of clusters to produce a capability model;

based on determining to instantiate an application via the cluster, wherein an application package comprising a deployment manifest is configured to instantiate the application, determining a capability of capabilities of the cluster based on the capability model and the deployment manifest;

modifying the deployment manifest based on the capability to produce a modified deployment manifest;

configuring the capability corresponding to operational characteristics of the application identified in the modified deployment manifest; and initiating instantiation of the application via the cluster with the modified deployment manifest.

16. The non-transitory computer-readable medium of claim 15, wherein instantiation of the application is a first instantiation of a first application, wherein the cluster is a first cluster, and wherein the operations further comprise:

as part of initiating a second instantiation of a second application on a second cluster of the group of clusters, determining to instantiate the second application with a normalized profile for a type of the second selected cluster based on failing to identify a pre-existing deployment modifier that corresponds to the application and the second cluster.

17. The non-transitory computer-readable medium of claim 15, wherein the application package identifies supported states of the capability for workloads of the application in an abstract format that is independent of implementation-specific information of the cluster.

18. The non-transitory computer-readable medium of claim 17, wherein modifying the deployment manifest comprises:

translating the supported states of the capability for workloads of the application in the abstract format to a format of the cluster.

19. The non-transitory computer-readable medium of claim 15, wherein producing the modified deployment manifest comprises:

creating a virtual network function descriptor package that comprises the modified deployment manifest, and wherein instantiating the application via the cluster with the modified deployment manifest comprises instantiating the application with the virtual network function descriptor package.

20. The non-transitory computer-readable medium of claim 15, wherein modifying the deployment manifest based on the capability to produce the modified deployment manifest comprises:

based on an abstract profile of the deployment manifest that corresponds to the capability, and an identification of the cluster, selecting a translation package from a group of stored translation packages; and modifying the abstract profile based on the translation package.

\* \* \* \* \*